United States Patent
Till et al.

(10) Patent No.: US 7,404,276 B2
(45) Date of Patent: *Jul. 29, 2008

(54) BEVERAGE BOTTLING PLANT FOR ASEPTIC FILLING OF BEVERAGE BOTTLES WITH A LIQUID BEVERAGE FILLING MATERIAL

(75) Inventors: Volker Till, Hofheim am Taunus (DE); Daryoush Sangi, Hamburg (DE)

(73) Assignee: KHS Maschinen-und Anlagenbau AG, Dortmund (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/676,085

(22) Filed: Feb. 16, 2007

(65) Prior Publication Data

US 2007/0193652 A1    Aug. 23, 2007

(30) Foreign Application Priority Data

Feb. 17, 2006    (DE)  ........................ 10 2006 007 366

(51) Int. Cl.
*B65B 61/00* (2006.01)
*B65B 55/04* (2006.01)
*B67C 7/00* (2006.01)

(52) U.S. Cl. ........................... 53/136.1; 53/167; 53/281
(58) Field of Classification Search ................ 53/136.1, 53/167, 281, 284.5
See application file for complete search history.

(56) References Cited

U.S. PATENT DOCUMENTS

| 3,799,220 | A | 3/1974 | Berry et al. | |
| 2007/0193222 | A1* | 8/2007 | Till et al. | 53/167 |
| 2007/0193652 | A1* | 8/2007 | Till et al. | 141/144 |
| 2007/0204562 | A1* | 9/2007 | Till et al. | 53/167 |

FOREIGN PATENT DOCUMENTS

| DE | 201 20 014 U1 | 3/2003 |
| EP | 1 369 379 A1 | 10/2006 |
| WO | WO 2004/065283 A1 | 8/2004 |

* cited by examiner

*Primary Examiner*—Stephen F. Gerrity
(74) *Attorney, Agent, or Firm*—Nils H. Ljungman & Associates

(57) ABSTRACT

A plant for the cold aseptic bottling of a liquid in bottles with a conveyor line on which bottles are moved by at least one bottle handling machine in a sterile space which is separated by a housing from at least one non-sterile space, whereby the housing is formed by at least one circulating part and one stationary part, and whereby at the transition between these parts, a siphon seal is provided which makes possible the relative motion of the parts, which siphon seal comprises at least one annular duct that concentrically surrounds an axis of the circulating part to hold a sealing or barrier fluid on a ring-shaped wall element on the other part of the housing that extends into the barrier fluid located there, with at least one inlet for the feeding of the barrier fluid into the at least one annular duct and with at least one outlet for the discharge of the barrier fluid out of the annular duct, wherein the at least one outlet is realized in the form of an overflow that sets the level of the barrier fluid, and that the at least one inlet is connected with a reservoir, from which barrier fluid is fed continuously to at least one annular duct. Further, a plant for cold aseptic bottling, where there are a plurality of siphon seals on different levels, each at transitions between a circulating or rotating part of the housing and a stationary part of the housing.

20 Claims, 7 Drawing Sheets

BEVERAGE BOTTLING PLANT FOR ASEPTIC FILLING OF BEVERAGE BOTTLES WITH A LIQUID BEVERAGE FILLING MATERIAL

BACKGROUND

1. Technical Field

This application relates to a beverage bottling plant for aseptic filling of beverage bottles with a liquid beverage filling material.

2. Background Information

A beverage bottling plant for filling bottles with a liquid beverage filling material can possibly comprise a beverage filling machine, which is often a rotary filling machine, with a plurality of beverage filling positions, each beverage filling position having a beverage filling device for filling bottles with liquid beverage filling material. The filling devices may have an apparatus designed to introduce a predetermined volume of liquid beverage filling material into the interior of bottles to a substantially predetermined level of liquid beverage filling material.

Some beverage bottling plants may possibly comprise filling arrangements that receive a liquid beverage material from a toroidal or annular vessel, in which a supply of liquid beverage material is stored under pressure by a gas. The toroidal vessel may also be connected to at least one external reservoir or supply of liquid beverage material by a conduit or supply line. In some circumstances it may even be possible that a beverage bottling plant has two external supply reservoirs, each of which may be configured to store either the same liquid beverage product or different products. These reservoirs could possibly be connected to the toroidal or annular vessel by corresponding supply lines, conduits, or other arrangements. It is also possible that the external supply reservoirs could be in the form of simple storage tanks, or in the form of liquid beverage product mixers.

A wide variety of types of filling elements are used in filling machines in beverage bottling or container filling plants for dispensing a liquid product into bottles, cans or similar containers, including but not limited to filling processes that are carried out under counterpressure for the bottling of carbonated beverages. The apparatus designed to introduce a predetermined flow of liquid beverage filling material further comprises an apparatus that is designed to terminate the filling of the beverage bottles upon the liquid beverage filling material reaching the predetermined level in bottles. There may also be provided a conveyer arrangement that is designed to move bottles, for example, from an inspecting machine to the filling machine.

After a filling process has been completed, the filled beverage bottles are transported or conveyed to a closing machine, which is often a rotary closing machine. A revolving or rotary machine comprises a rotor, which revolves around a central, vertical machine axis. There may further be provided a conveyer arrangement configured to transfer filled bottles from the filling machine to the closing station. A transporting or conveying arrangement can utilize transport star wheels as well as linear conveyors. A closing machine closes bottles by applying a closure, such as a screw-top cap or a bottle cork, to a corresponding bottle mouth. Closed bottles are then usually conveyed to an information adding arrangement, wherein information, such as a product name or a manufacturer's information or logo, is applied to a bottle. A closing station and information adding arrangement may be connected by a corresponding conveyer arrangement. Bottles are then sorted and packaged for shipment out of the plant.

Many beverage bottling plants may also possibly comprise a rinsing arrangement or rinsing station to which new, non-return and/or even return bottles are fed, prior to being filled, by a conveyer arrangement, which can be a linear conveyor or a combination of a linear conveyor and a starwheel. Downstream of the rinsing arrangement or rinsing station, in the direction of travel, rinsed bottles are then transported to the beverage filling machine by a second conveyer arrangement that is formed, for example, by one or more starwheels that introduce bottles into the beverage filling machine.

It is a further possibility that a beverage bottling plant for filling bottles with a liquid beverage filling material can be controlled by a central control arrangement, which could be, for example, a computerized control system that monitors and controls the operation of the various stations and mechanisms of the beverage bottling plant.

Plants for the cold aseptic bottling of a liquid in bottles or similar containers, for example for the cold aseptic bottling of heat-sensitive beverages (e.g. fruit juices) are known in a number of different realizations. The individual machines that make up a plant of this type and are arranged one after another in the manufacturing or treatment line, such as, for example, a rinser, sterilizer, filling machine and capper, are provided with housings, and specifically so that inside the plant there is a conveyor line for the containers or bottles in a sterile space which is sealed by this housing with respect to adjacent non-sterile spaces or areas, for example the atmosphere, and also to prevent the penetration of germs and bacteria.

Among other things, when a machine with a rotary construction is used, as is conventional for rinsers, sterilizers, filling machines and/or capping machines, a housing of this type generally has a plurality of transitions between a rotating or circulating portion of the housing and a stationary part of this housing, so that special seals are necessary in these areas.

Seals of this type of the prior art (WO2004/065283) are realized in the form of labyrinth or siphon seals. Each siphon seal thereby consists essentially of at least one circular, encircling gutter-like duct or annular duct that encircles the axis of rotation or revolution of the circulating part of the housing, into which duct a circular ring shaped wall segment on an element of the siphon seal that is provided on the other part of the housing extends. At least during the filling operation, the annular duct is filled with a barrier liquid so that the at least one annular wall segment of the siphon seal is immersed to a sufficient depth in the barrier liquid, so that the gap that remains between the two elements of the respective siphon seal is tightly sealed by the barrier liquid. The barrier liquid contains a sterilizing medium and consists, for example, of distilled sterile water and contains a specified percentage of hydrogen peroxide $H_2O_2$. As a rule, the element of the siphon seal that forms the at least one annular duct is provided on the non-circulating part and the element of the siphon seal that has the annular wall segment that extends into the annular duct is provided on the circulating part of the housing at the transition in question.

To achieve the desired sealing and barrier action, the surface of the barrier fluid in the respective annular duct must not fall below a specified level. For this purpose, on the machine of the prior art there is a separate buffer reservoir for the barrier fluid associated with each siphon seal, which buffer reservoir is connected via a line with the annular duct of the siphon seal in the manner of communicating pipes. By means of an electronic control circuit with a level sensor in the buffer reservoir and a control valve in a supply line, the level of the barrier fluid is maintained at a specified level, so that the liquid level of the barrier fluid in the annular duct of the associated siphon seal will be maintained at the specified level.

Because of design and construction requirements, such siphon seals are required at different levels in a plant for cold aseptic bottling, so that in the plant of the prior art, an independent buffer reservoir with a control circuit and the associated components (sensors, control valves etc.) is necessary at least for each level, which entails a significant construction effort and expense. In the plant of the prior art, the cleaning and/or sterilization of a plurality of siphon seals is a complex and time-consuming operation.

One possible disadvantage of in some plants is that individual siphon seals are exposed to both the sterile space or area as well as to the non-sterile space or area, which means that, for example, the sealing or barrier fluid can be contaminated by factors from the non-sterile space, and/or by factors from the sterile space, e.g. by the liquid being bottled. It is likewise impossible to prevent the exposure of persons (operating personnel) to unpleasant odors or injuries that can be caused by the barrier fluid.

OBJECT OR OBJECTS

An object of at least one possible embodiment of the present application is to indicate a sealing system that eliminates these disadvantages.

SUMMARY

At least one possible embodiment of the present application may be a system for the sealing of a transition between a circulating and a stationary machine element of a plant or device for the treatment of bottles or similar containers, for the sealing of the transition between a circulating and a stationary part of a housing of a plant for cold aseptic bottling that separates a sterile room or space from a non-sterile room or space, with a siphon seal that makes possible a relative motion between the machine elements and has at least one annular duct that concentrically encircles an axis of the rotating machine element to hold a sealing or barrier fluid on a machine element and at least one annular wall segment on the other machine element that extends into the barrier fluid located in the ring duct, wherein at least one outlet opening or nozzle for a cleaning and/or sterilization medium for the cleaning and/or sterilization of the seal system and thereby of the at least one siphon seal in a CIP and/or SIP sterilization process.

Another possible embodiment of the present application may be a plant or device for treating bottles or similar containers with at least one transition between a circulating machine element and a stationary machine element and with a sealing system that is provided at the transition and makes possible the relative motion between the machine elements.

In at least one embodiment example of the present application, at least one siphon seal is provided with at least one discharge opening or nozzle for a cleaning or sterilization medium, so that this seal or its annular duct can then be thoroughly or cleaned and/or sterilized more easily in a CIP (cleaning in place) cleaning or SIP (sterilization in place) sterilization, which is a major advantage, in a plant that has a plurality of siphon seals. The cleaning and sterilization of the siphon seals in a plant that has a plurality of such seals can be done in a single process.

The sealing system described herein by at least one possible embodiment example of the present application, can be used advantageously in plants for the treatment of bottles or similar containers in any or essentially any applications where a seal is necessary between a circulating part or element and a stationary part or element of the plant in question, such as at the transition between a circulating and a stationary part of a machine or plant for the cold aseptic bottling of a liquid in bottles or similar containers.

In at least one possible embodiment of the present application, at the transition between the circulating or rotating part of the housing and the stationary part of the housing, in addition to the at least one siphon seal, there is also at least one mechanical seal, which then comprises a sealing element on one part of the housing that extends along the siphon seal, which sealing element interacts with a sealing surface on the other part of the housing. This mechanical seal is provided or substantially provided on the side of the siphon seal that faces the non-sterile area, so that the siphon seal is shielded by the mechanical seal with respect to the non-sterile area. This arrangement has several additional advantages. For example, during the CIP cleaning and/or SIP sterilization, the escape of the medium used to the external environment is prevented or essentially prevented. As a result of the mechanical seal, direct contact between the barrier fluid and the non-sterile area and/or with the air in the non-sterile area is prevented, which among other things reduces the risk of pollution and/or microbial or bacterial contamination of the barrier fluid. The escape of barrier fluid and/or of the sterilization medium present in this fluid into the non-sterile area is also prevented or essentially prevented, as well as any adverse effects such an escape may have such as, for example, the release of odors that are unpleasant to human beings such as the operating personnel, for example, who may be present in the non-sterile area.

In a plant for cold aseptic bottling, as a rule or general rule there are a plurality of sealing systems with mechanical seals and siphon seals on different levels, each at the transitions between a circulating or rotating part of the housing and a stationary part of the housing. All or essentially all of the siphon seals and/or their annular ducts are then constantly supplied with barrier fluid from a common supply or feed container or reservoir, and specifically, for example, by means of a common pump and via individual means that are associated with the individual siphon seals for the setting or regulation of the volume flow of the barrier fluid that flows to the respective siphon seal. Because the at least one outlet of the respective annular duct is realized in the form of an overflow, the required level of the barrier fluid can be set independently in each annular duct without the need for an electronic control circuit.

On account of the means provided individually in the feed or supply lines of the siphon seals for the setting or regulation of the volume flow, hydrostatic differences that result from the different height levels of the various siphon seals can be equalized. These means are formed by control valves for the setting and regulation of the volume flow, and can be set once, for example, when the plant is started up As a result of the setting of the volume of the barrier fluid, account can be taken of different contamination conditions on the individual siphon seals, i.e. the volume flow at such siphon seals, at which the barrier fluid is subject to greater fouling or microbial and bacterial contamination as a result of the configuration and/or location of the seal in question and/or as a result of external factors, is set higher than at those siphon seals on which the degree of fouling or contamination is lower.

To immediately detect any faults that may occur in the supply system that supplies the siphon seals with the seal or barrier fluid, and in the event of a fault to take the appropriate measures, for example to transmit a fault message and/or to interrupt the filling process, located in the barrier fluid return of each siphon seal is a flow meter, which either measures the actual volume flow of the return flow of barrier fluid and compares it with the volume flow of the barrier fluid that was fed to the siphon seal in question, so that if the difference exceeds a specified tolerance limit, and/or triggers the fault message and/or the production interruption is triggered and/or the fault message and/or the immediate production interruption is triggered if the flow meter in question does not detect the return flow of barrier fluid and/or if the volume flow measured by the flow meter is below a specified threshold.

At least one possible embodiment of the present application, however, neither provides nor requires a control of the level of the barrier fluid in the siphon seals. The construction is thereby significantly simplified or substantially simplified, and operational reliability is significantly improved or substantially improved, because the electronic control circuits that regulate the level of the barrier fluid can be omitted. Developments of at least one possible embodiment of the present application are described herein.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

At least one possible embodiment of the present application is explained in greater detail below illustrated in the accompanying drawings, in which.

DESCRIPTION OF EMBODIMENT OR EMBODIMENTS

Figure 1:
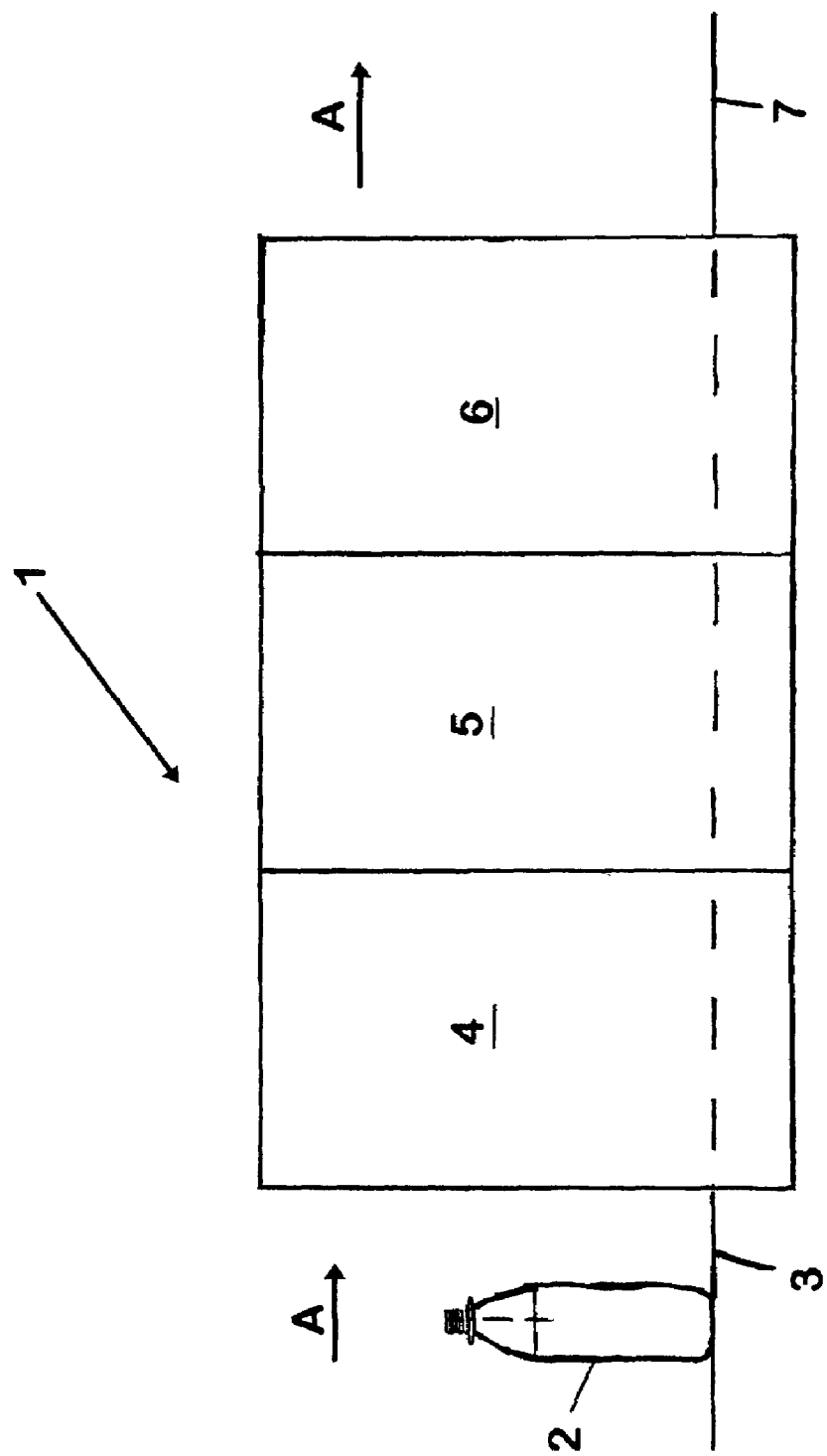
FIG. 1 is a greatly simplified block diagram showing a plurality of individual machines combined into a plant for a cold-sterile or cold aseptic bottling of a liquid in bottles.
Figure 1A:
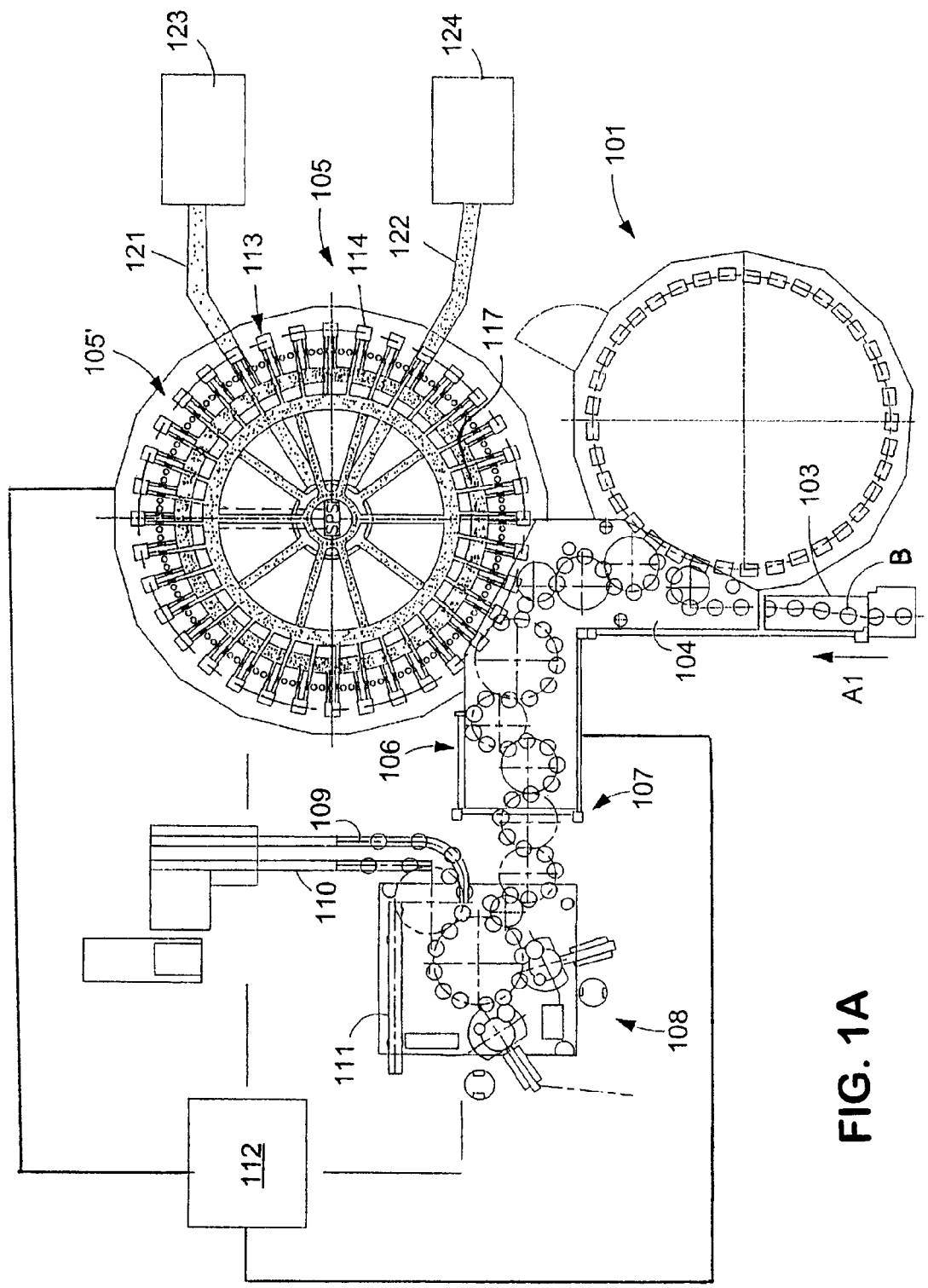
FIG. 1A shows schematically the main components of one possible embodiment example of a system for filling containers.

FIG. 1A shows schematically the main components of one possible embodiment example of a system for filling containers, specifically, a beverage bottling plant for filling bottles B with at least one liquid beverage, in accordance with at least one possible embodiment, in which system or plant could possibly be utilized at least one aspect, or several aspects, of the embodiments disclosed herein.

FIG. 1A shows a rinsing arrangement or rinsing station 101, to which the containers, namely bottles B, are fed in the direction of travel as indicated by the arrow A1, by a first conveyer arrangement 103, which can be a linear conveyor or a combination of a linear conveyor and a starwheel. Downstream of the rinsing arrangement or rinsing station 101, in the direction of travel as indicated by the arrow Al, the rinsed bottles B are transported to a beverage filling machine 105 by a second conveyer arrangement 104 that is formed, for example, by one or more starwheels that introduce bottles B into the beverage filling machine 105.

The beverage filling machine 105 shown is of a revolving or rotary design, with a rotor 105', which revolves around a central, vertical machine axis. The rotor 105' is designed to receive and hold the bottles B for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles B to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 1A, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle B, the first product or the second product can be filled by means of an appropriate control of the filling product or fluid valves.

Downstream of the beverage filling machine 105, in the direction of travel of the bottles B, there can be a beverage bottle closing arrangement or closing station 106 which closes or caps the bottles B. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles B. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles B to different locations.

The first output conveyer arrangement 109, in the embodiment shown, is designed to convey bottles B that are filled with a first type of liquid beverage supplied by, for example, the supply reservoir 123. The second output conveyer arrangement 110, in the embodiment shown, is designed to convey bottles B that are filled with a second type of liquid beverage supplied by, for example, the supply reservoir 124. The third output conveyer arrangement 111, in the embodiment shown, is designed to convey incorrectly labeled bottles B. To further explain, the labeling arrangement 108 can comprise at least one beverage bottle inspection or monitoring device that inspects or monitors the location of labels on the bottles B to determine if the labels have been correctly placed or aligned on the bottles B. The third output conveyer arrangement 111 removes any bottles B which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

Figure 1B:
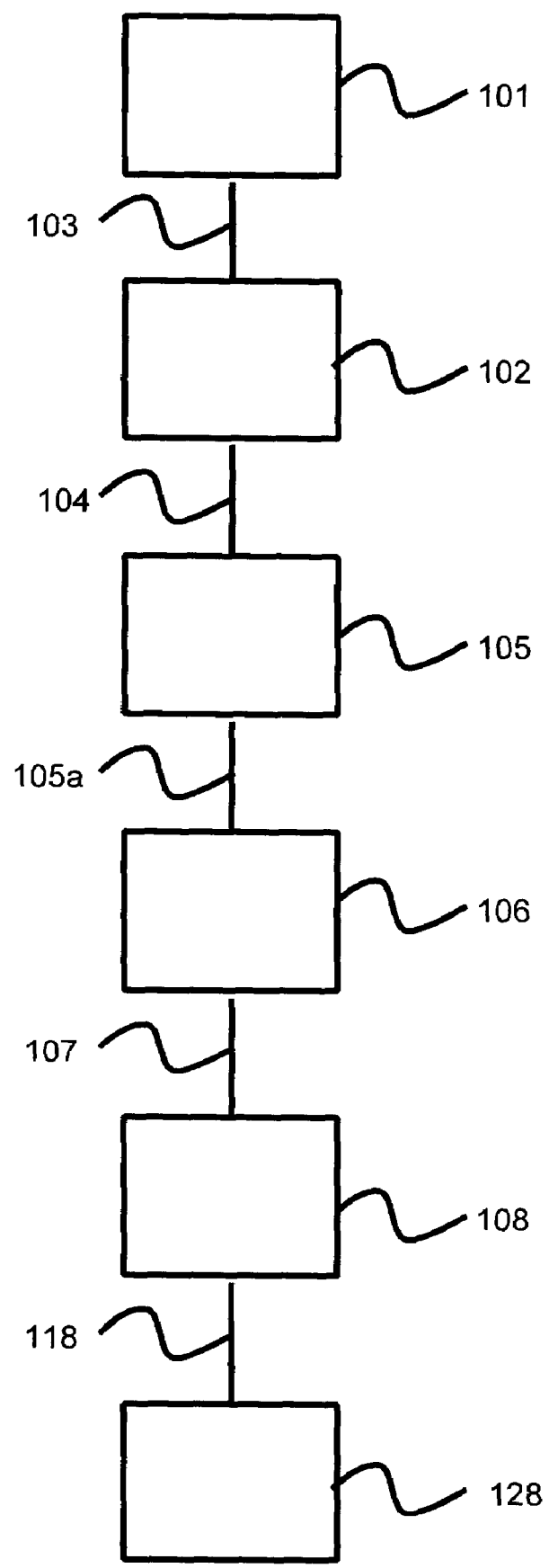
FIG. 1B is a block diagram showing the main components of one possible embodiment example of a system for filling containers.

FIG. 1B shows the main components of one possible embodiment example of a system for filling containers, with conveyors connecting each of the individual stations. In at least one possible embodiment, a first conveyor arrangement 103 transports bottles B from a rinsing arrangement or rinsing station 101 to a sterilizing station 102. Then a second conveyor arrangement 104 transports bottles B to a beverage filling station 105. After leaving the beverage filling station 105, the bottles B travel via a third conveyor arrangement 105a to a beverage bottle closing arrangement or closing station 106. There is a fourth conveyor arrangement 107 that connects the beverage bottle closing arrangement or closing station 106 to a beverage bottle labeling arrangement or labeling station 108. Finally, bottles are transported on a fifth conveyor arrangement 118 to a packaging station 128.

Figure 3:
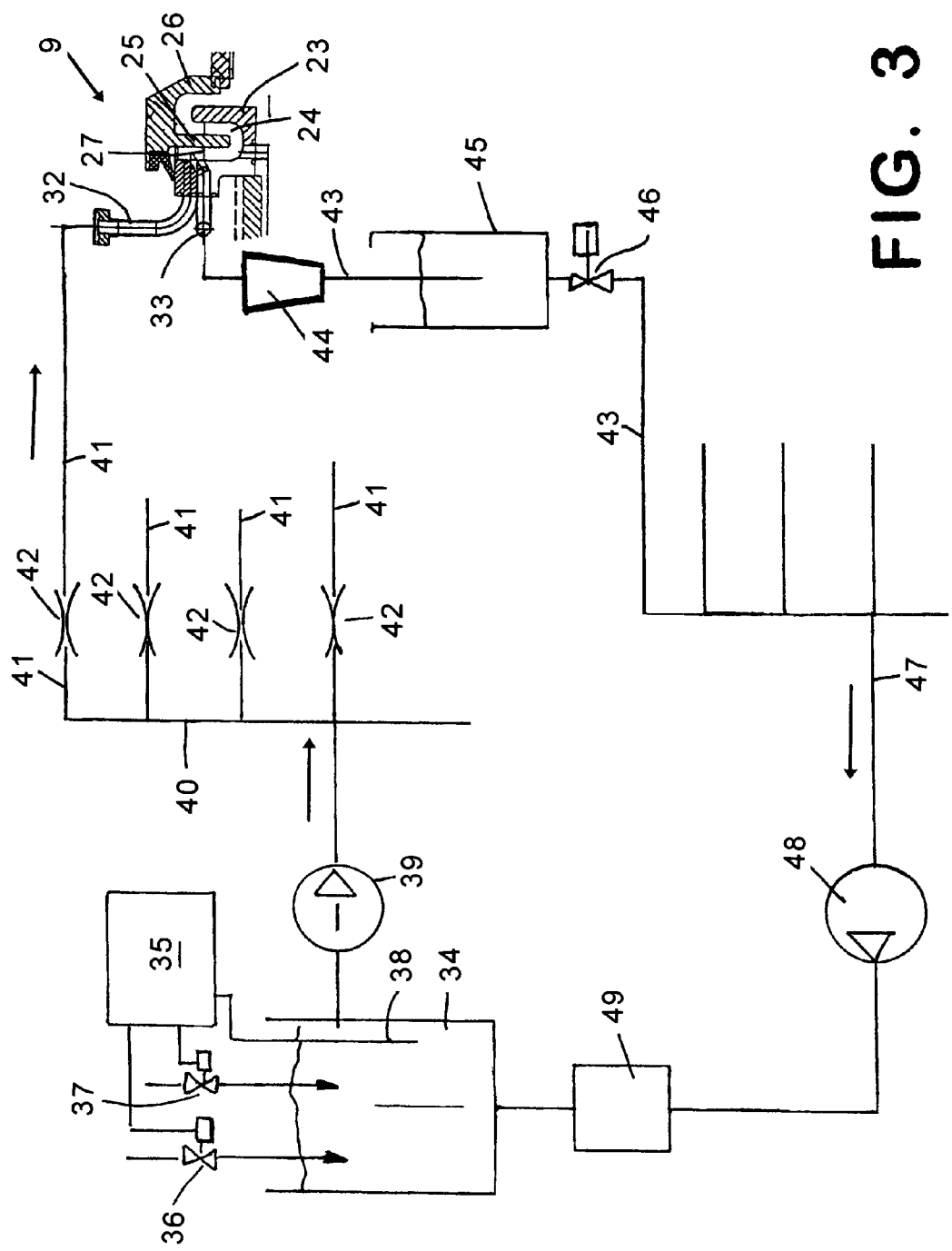
FIG. 3 shows a system to supply a plurality of siphon and labyrinth seals with the required sealing or barrier fluid.
Figure 3A:
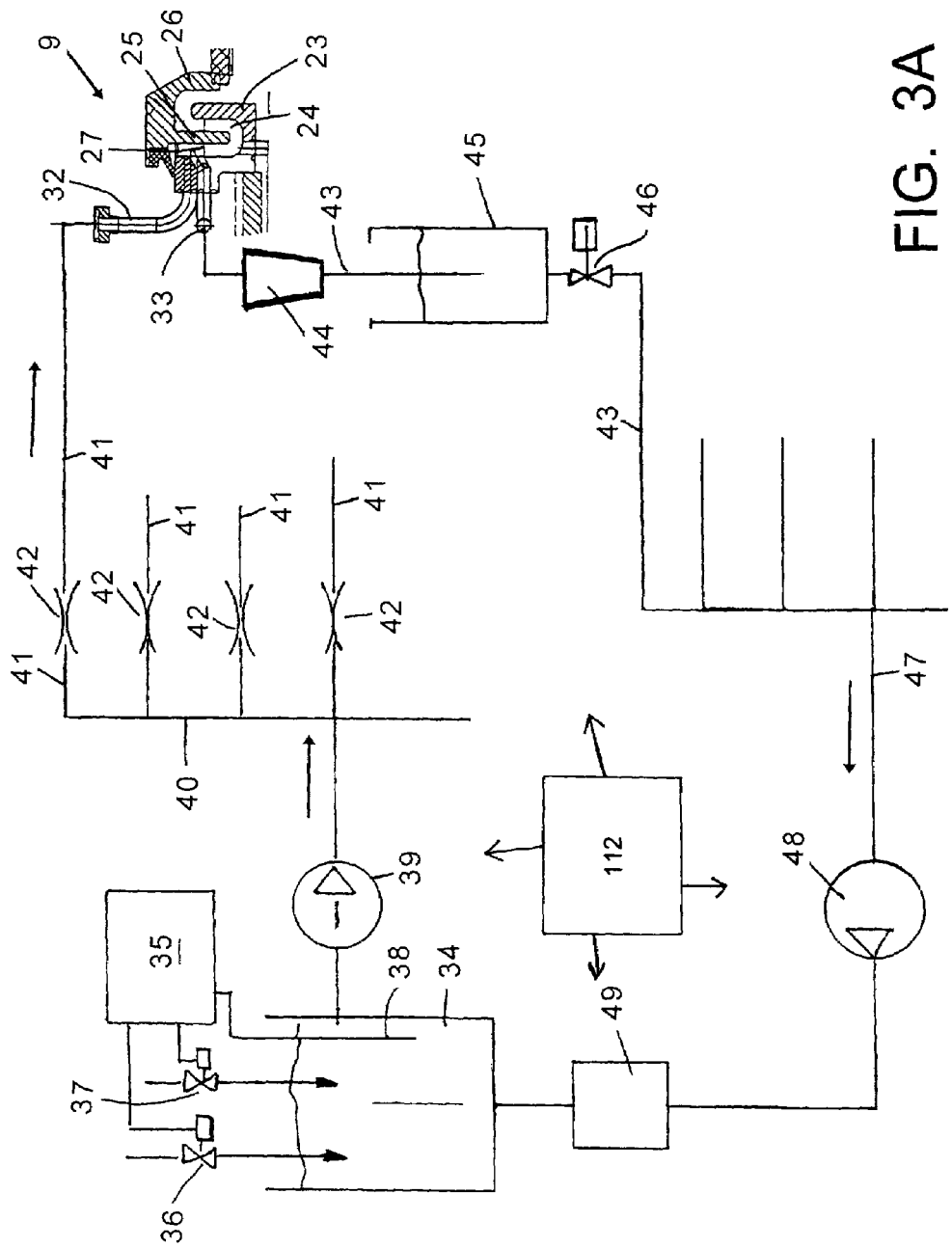
FIG. 3A shows a central control arrangement as it applies to FIG. 3.

FIG. 3A shows a central control arrangement 112, controlling the beverage bottling plant which could be, for example, a computerized control system that monitors and controls the operation of the various stations and mechanisms of the beverage bottling plant.

In FIG. 1, the overall plant is designated 1 and is used for the cold aseptic bottling of a liquid in bottles 2 which are fed to the plant 1 via a conveyor 3 (Arrow A) and, for example, are first cleaned in the plant and treated in a sterilizer 4 with a suitable treatment medium, including but not limited to a heated or vaporized aerosol consisting of air and hydrogen peroxide ($H_2O_2$), then filled with the liquid in a filling machine 5 and finally closed in a capper 6, so that the filled and closed bottles 2 can then be fed via the conveyor 7 to an additional station, such as a labeling machine, for example.

Inside the plant 1, the bottles move in a sterile, germ-free space that is sealed off from the outside environment and is formed by a corresponding housing. But since the sterilizer 4, like other individual machines, e.g. the filling machine 5 and the capping machine 6, as well as a rinser, if any, which is not shown, is realized in the form of a machine that has a rotary construction, in the vicinity of the housing or at the separation between the sterile space and the non-sterile space there are also respective housing transitions between each rotating or circulating element and a stationary, i.e. non-rotating or non-circulating element. A transition of this type is shown by way of example in FIG. 2 and identified by the arrow 8. To seal transitions of this type, siphon or labyrinth seals are provided at these points. A seal of this type is illustrated by way of example in FIG. 2 and is designated 9 in general.

Figure 2:
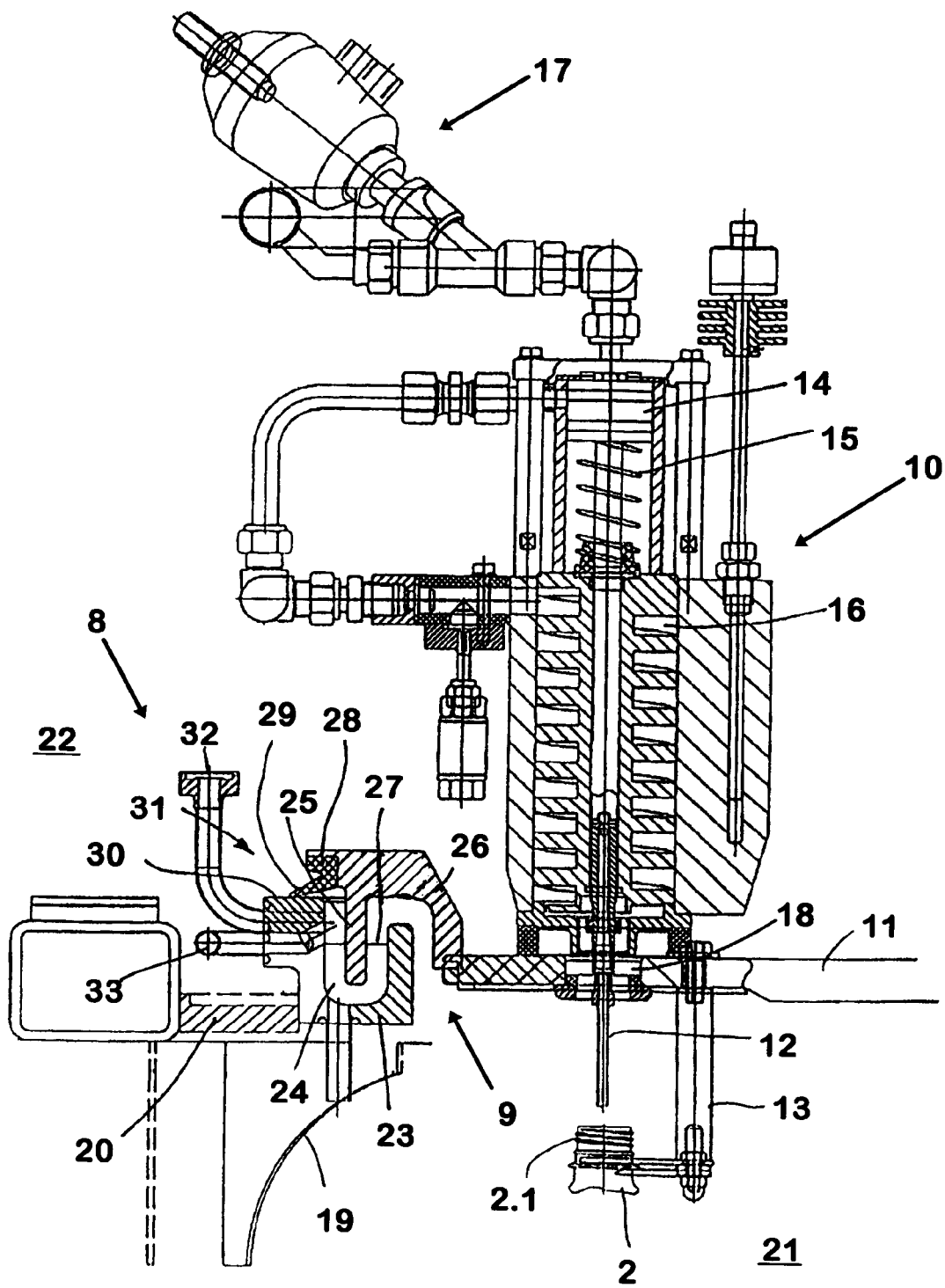
FIG. 2 is a detail showing one of the treatment and/or sterilization heads of a device or individual machine (sterilizer) for the sterilization of the bottles, together with a siphon or labyrinth seal on a housing transition that separates a sterile space from a non-sterile space, e.g. the atmosphere.

FIG. 2 shows in detail a treatment head of the sterilizer 4. This treatment head is provided on the upper side of a disc-like rotor 11 that is driven in rotation around a vertical machine axis, and essentially has a configuration that will be familiar to a technician skilled in the art, and specifically with, among other things, a nozzle pipe 12 which projects beyond the underside of the rotor 11 and can be introduced into the respective bottle 2 through its bottle mouth 2.1 for the sterilization. The bottles 2 are each held in a bottle carrier 13 which is provided in the vicinity of each treatment head 10 on the rotor 11. The lowering and raising of the nozzle pipe is done pneumatically by an actuation device (piston 14 and restoring spring 15) provided in the housing of the treatment head 10. A helical duct 16 is also provided in the treatment head 10 to carry the flow of the treatment or sterilization medium provided in a nozzle system 17 during the sterilization phase. The treatment head 10 is also fastened in a sealed manner to the upper side of the disc-shaped rotor 11 so that only the nozzle tube 12 projects through a sealed opening 18 in the rotor 11 beyond the underside of this rotor.

The rotor 11 and a partition 19 that does not circulate with the rotor, i.e. a stationary partition, on a machine frame 20 are parts of a housing which separates a sterile space 21 which is formed underneath the rotor 11 and inside the wall 19, and in which the bottles 2 move, from an outer, non-sterile space 22. At the transition 8 between the rotor 11 and the stationary wall element 19, as mentioned above, there is a siphon or labyrinth seal 9. In the illustrated embodiment, this seal consists essentially of an encircling ring 23 which does not rotate with the rotor and is provided on the machine frame 20 and is concentric with the vertical axis of the rotor 11, which ring forms an open annular duct 24 that is open on the other side. Projecting from above into this annular duct 24 is a circular annular wall segment 25 which surrounds the axis of the rotor 11 concentrically, which wall segment is a component of an annular body 26 that is fastened to the periphery of the circular disc-shaped rotor 11.

For the sterile sealing of the space 21 with respect to the environment 22, the annular duct 24 is filled up to a level 27 with a barrier fluid, so that the wall segment 25 is immersed over a large portion of its axial length in this liquid, thereby resulting in the siphon or labyrinth seal 9.

The barrier fluid consists, for example, of sterile or distilled water and, to meet the sanitary requirements of the bottling process, has sterilizing, cleaning and anti-bacterial properties, which are achieved by maintaining a minimum concentration of an anti-bacterial and sterilizing additive such as $H_2O_2$. The $H_2O_2$ concentration can be 35%, for example.

Radially outboard of the ring body, with reference to the axis of the rotor 11, is a sealing ring 28 with a lip seal 29 made of a suitable elastic rubber material or an elastomer plastic. The lip seal 29 of the sealing ring 28 that concentrically encircles the axis of the rotor 11 list on a annular seal surface 30 which also concentrically encircles the axis of the rotor 11, whereby the sealing surface 30 is provided on the radially outward side of the ring 23 that faces away from the rotor 11. The seal 28 that interacts with the sealing surface 30 forms an additional mechanical seal 31. It is thereby essential that this seal 31 be provided between the siphon or labyrinth seal 9 and the non-sterile area 22, e.g. the environment, i.e. the mechanical seal 31 must seal the siphon or labyrinth seal 9 with respect to the environment 22.

The mechanical seal 31 among other things prevents the barrier fluid or the sterilization medium contained in the barrier fluid from getting into the environment and thereby annoying any persons in the environment, including the operating personnel, at least on account of the odor of the barrier fluid and/or the possibility that the barrier fluid could contaminate or endanger the environment or the personnel in it.

The barrier fluid is effectively protected by the mechanical seal 31 against fouling and/or microbial or bacterial contamination by the environment 22, so that the desired barrier effect is achieved with a high degree of reliability.

One thing, among others, that is essential for the achievement of the desired barrier action is that the annular duct 26 must be sufficiently filled with the barrier fluid, i.e. up to the level 27, and thus that the segment 25 extends to a sufficient depth in the barrier fluid. To guarantee that the required level is maintained, during the filling operation, barrier fluid is continuously fed to the annular duct 24 via one or more inlets 32, and this fluid is continuously drained from the annular duct 24 by means of one or more outlets 33. The outlets 33 are realized in the form of overflow, so that the desired level of barrier fluid in the annular duct 24 is set automatically, i.e. without any regulation of the level 27 of the barrier fluid.

In the vicinity of the plant 1, a plurality of transitions are provided between a circulating part and a stationary part of the housing, and specifically, for example, in the vicinity of the filling machine and in the vicinity of the capper 6. At all of these transitions 8, siphon or labyrinth seals corresponding to the siphon or labyrinth seal 9 are provided, and specifically again each with an additional mechanical seal 31 on the outboard side of the respective siphon seal 9, i.e. the side facing the environment.

The supply system illustrated in FIG. 3 is used to supply all the siphon seals 9, which among other things are located at different levels on account of the machine design. This supply system includes, among other things, a preparation and supply tank 34 for the fresh barrier fluid. $H_2O_2$ and distilled and sterile water are added to this tank via control valves 36 and 37 controlled by a processor 35, and specifically as a function of the required $H_2O_2$ concentration (e.g. 35%) of the barrier fluid, which is monitored by a sensor 38.

The supply tank 34 is connected to various ring mains or supply lines 41, each of which is connected with the inlets 32 of the annular duct 24 of a siphon seal 9 by means of a control valve 42 to set the volume flow or the throughput. The respective control valve 42 is thereby set, e.g. at startup or during a trial run, so that in spite of the different heights of the individual siphon seals 9, sufficient barrier fluid flows to each siphon seal in the annular duct 24, and specifically not only to maintain the required level 27 of the fluid level of the barrier fluid in the respective annular duct 24, but also to achieve a sufficient exchange of the barrier fluid in the respective annular duct 24, among other things as a function of the expected level of contamination. The respective control valve 42 is thereby set to maintain a constant volume flow for the barrier fluid flowing to the respective siphon seal 9.

The outlets 33 of each annular duct 24 are connected with a common line 43 in which a flow meter 44 is provided and which leads to a buffer tank 45. By means of a control valve 46 provided on the outlet of the buffer tank 45, the buffer tank 45 is drained with a control of the level of fluid in it, and specifically into a ring main or main line 47 that is common to all the siphon seals 9, and by means of which the barrier fluid is returned by means of an additional pump 48 provided in this main line to the tank 34. Also provided in the main line 47 is a sensor or analysis unit 49, with which the $H_2O_2$ content of the returned barrier fluid is analyzed, so that then, as a function of the measurement data supplied by this sensor unit 49, the addition of $H_2O_2$ can be controlled by the processor 35, and specifically to maintain the necessary $H_2O_2$ concentration.

The supply system illustrated in FIG. 3 ensures, among other things, that all of the siphon seals 9, including those at different heights, are supplied with sufficient barrier fluid, and that the barrier fluid in each siphon seal 9 also has the required $H_2O_2$ concentration. A significant safety factor is thereby represented by the individual flow meters 44 that are provided in the return lines 43 from each siphon seal 9. The flow meter 44 monitors whether a sufficient quantity of barrier fluid is flowing back via the discharges 33 that are realized in the form of overflows. Then, if the quantity of barrier fluid flowing back through the flow meter 44 drops below a specified lower threshold, the measurement data from the flow meter 44 optically and/or acoustically triggers a fault message for the plant 1, and/or the operation of the plant 1 is stopped.

For this purpose, the flow meter 44 measures, for example, the volume flow of the barrier fluid flowing back from the siphon seal and then compares it with the fixed value of the volume flow of the barrier fluid flowing to the respective siphon seal 9. If the difference exceeds a specified tolerance, a fault message is generated, which transmits the optical and/or acoustical fault signal and/or leads to an immediate interruption of production. Basically, for example, it is also possible to trigger a fault message if the volume flow of the barrier fluid flowing back from the respective siphon seal 9 is below a specified threshold.

In the above explanation, it has been assumed that the returning barrier fluid flows back to the tank 34 after passing the sensor unit 49. Basically, it is also possible to provide for further treatment of the barrier fluid before it is returned to the tank 34.

The described realization of the siphon seals 9 also makes it possible to clean all of the siphon seals 9 during the cleaning of the plant 1 in the context of a CIP (cleaning in place) cleaning, and in the context of an SIP (sterilization in place) sterilization. Precisely in the sector of cold aseptic bottling is it important to regularly clean and to disinfect or sterilize all of the areas of a plant 1 that are inside the sterile space 21.

Figure 4:
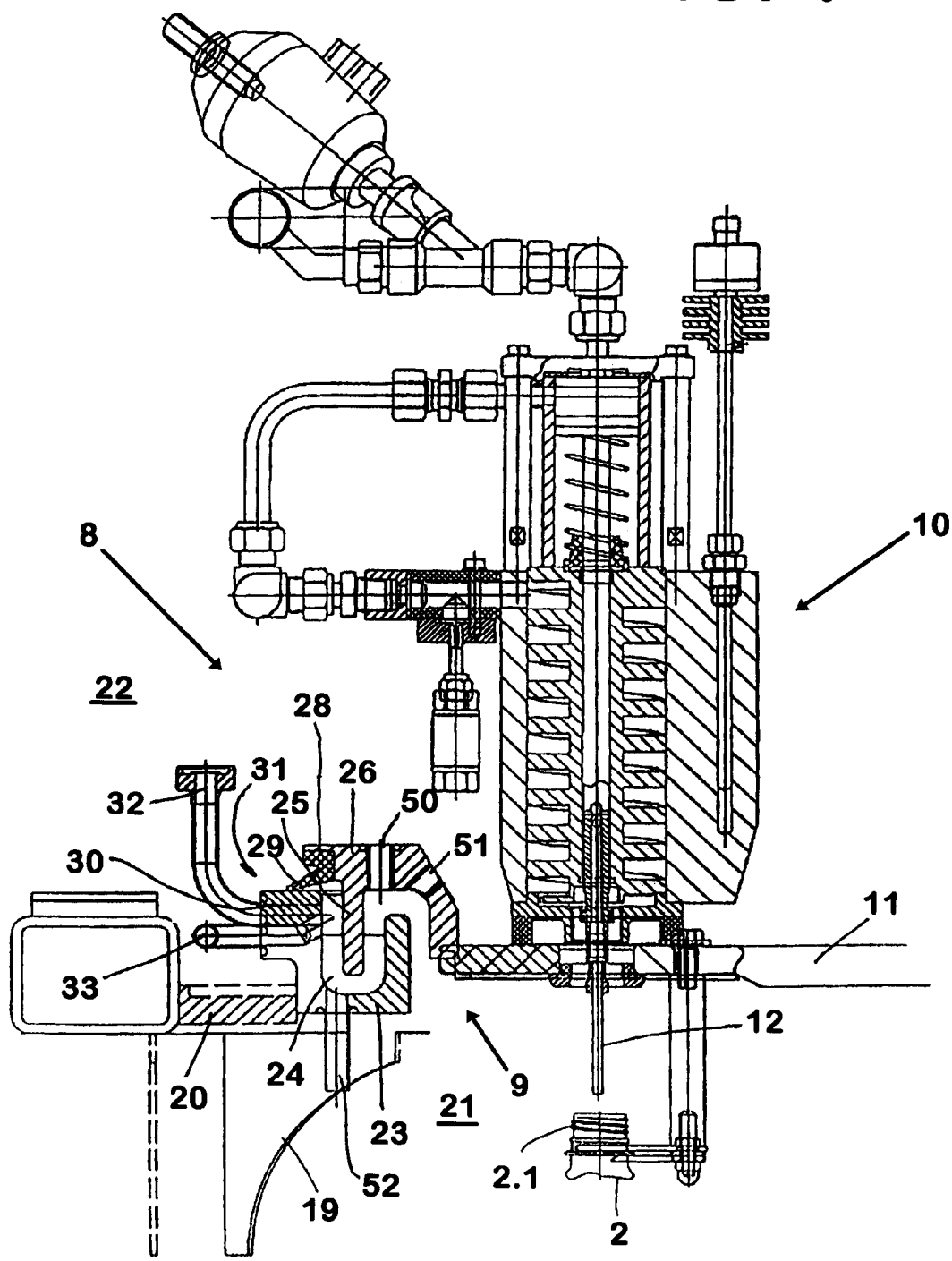
FIG. 4 like FIG. 2, but in a realization for a CIP cleaning and/or SIP sterilization of the siphon or labyrinth seal.

As illustrated in FIG. 4, for the CIP cleaning or SIP sterilization, on each siphon seal 9, in addition to the inlets 32 and outlets 33, there are nozzles or nozzle openings 50 and 51 which form a spray and disinfection device, and via which the respective siphon seal 9 and its ring 23 including the annular duct 24 are cleaned or rinsed with a cleaning fluid, and can then be treated with a liquid disinfection or sterilization medium, for example with a highly concentrated hydrogen peroxide solution. The nozzle openings 50 and 51 are for this purpose connected to a corresponding system for the supply of the cleaning and/or sterilization medium. The treatment medium that reaches the annular duct 24 flows out via the outlets 33. Additional outlets 52 that are closed during the normal bottling operation are also used to completely drain the respective annular duct 24.

In the illustrated embodiment, the nozzles and nozzle openings 50 and 51 respectively are provided on the rotating part, i.e. on the annular body 26 that rotates with the rotor, so that a cleaning of the entire siphon seal 9 and of the ring 23 with the annular duct 24 can be carried out with a relatively small quantity of cleaning and disinfection medium.

At least one possible embodiment of the present application was described above on the basis of one exemplary embodiment. It goes without saying that numerous modifications and variations can be made without thereby going beyond the teaching of at least one possible embodiment of the present application.

At least one possible embodiment relates to a sealing system for sealing a transition between a circulating and a stationary machine element of a plant or device for the treatment of bottles or similar containers, for sealing the transition between a circulating and a stationary part of a housing that separates a sterile space or area from a non-sterile space or area in a plant for cold aseptic, with a siphon seal 9 that makes possible a relative motion between the machine elements 11, 19 and has at least one annular duct 24 that concentrically encircles an axis of the rotating machine element 11 to hold a sealing or barrier fluid on a machine element 19, 20 and at least one annular wall segment 25 on the other machine element that extends into the barrier fluid located in the ring duct 24, wherein by at least one outlet opening or nozzle 50 and/or 51 for a cleaning and/or sterilization medium for the cleaning and/or sterilization of the seal system and thereby of the at least one siphon seal 9 in a CIP and/or SIP sterilization process.

An additional possible embodiment of the present application further relates to a plant or device for the treatment of bottles or similar containers, to a plant or device for cold aseptic bottling, with at least one transition between a circulating and a stationary machine element and with a sealing system that is provided at the transition and makes possible a relative motion between the machine elements, wherein containers 2 with at least one transition 8 between a circulating machine element 11 and a stationary machine element 19 and/or 20 and with a sealing system that is provided at the transition 8 and makes possible the relative motion between the machine elements.

A sealing system for the sealing of a transition between a circulating and a stationary machine element of a plant or device for the treatment of bottles or similar containers, for the sealing of the transition between a circulating and a stationary part of a housing of a plant for cold aseptic bottling that separates a sterile room or space from a non-sterile room or space comprises at least one siphon seal. On the sealing system, at least one outlet opening or nozzle is provided for a cleaning and/or sterilization medium for the cleaning and/or sterilization of the sealing system.

One possible aspect of one possible embodiment of the present application is to indicate a plant for the cold-aseptic bottling of a liquid in bottles or similar container in which, in spite of the simplified construction, the presence of the sealing or barrier fluid in the at least one annular duct of the at least one siphon seal at the required level is guaranteed or substantially guaranteed a sealing system that eliminates the disadvantage of having the individual siphon seal exposed to both a sterile space or area as well as to a non-sterile space or area, which means that, for example, that the sealing or barrier fluid can be contaminated by factors from the non-sterile space, and/or by factors from the sterile space, e.g. by the liquid being bottled. Another possible aspect of at least one possible embodiment of the present application is to indicate a plant for the cold-aseptic bottling of a liquid in bottles or similar container in which, the exposure of persons (operating personnel) to unpleasant odors or injuries that can be caused by the barrier fluid is prevented.

Another possible aspect of at least one possible embodiment of the present application is to indicate a plant for the cold-aseptic bottling of a liquid in bottles or similar container in which, there are a plurality of sealing systems with mechanical seals and siphon seals on different levels, each at the transitions between a circulating or rotating part of the housing and a stationary part of the housing.

Yet another possible aspect of at least one possible embodiment of the present application is to indicate a plant for the cold-aseptic bottling of a liquid in bottles or similar container in which, in spite of the simplified construction, the presence of the sealing or barrier fluid in at least one annular duct of at least one siphon seal at the required level is a sealing system that eliminates the disadvantage of requiring such siphon seals at different levels in a plant for cold aseptic bottling, so that an independent buffer reservoir with a control circuit and the associated components (sensors, control valves etc.) is necessary at least for each level, which entails a significant construction effort and expense.

Still another possible aspect of at least one possible embodiment of the present application is to indicate a plant for the cold-aseptic bottling of a liquid in bottles or similar container in which, at least one siphon seal is provided with at least one discharge opening or nozzle for a cleaning or sterilization medium, so that this seal and/or its annular duct can then be cleaned and/or sterilized in a CIP cleaning or SIP sterilization, which is a major advantage, in particular in a plant where there are a plurality of siphon seals provided at housing transitions. In particular, the cleaning and sterilization of the siphon seals of a plant with a plurality of such seals is significantly simplified and can be performed in less time.

A further possible aspect of at least one possible embodiment of the present application is to indicate a plant for the cold-aseptic bottling of a liquid in bottles or similar container in which, a barrier fluid is effectively protected by a mechanical seal against fouling and/or microbial or bacterial contamination by the environment, so that a desired barrier effect is achieved with a high degree of reliability and the cost of maintaining the desired H2O2 concentration may be reduced.

Another possible aspect of at least one possible embodiment of the present application is to indicate a plant for the cold-aseptic bottling of a liquid in bottles or similar container in which, a sealing system can be used in plants for the treatment of bottles or similar containers in any applications where a seal is necessary between a circulating part or element and a stationary part or element of the plant in question, especially, however, at the transition between a circulating and a stationary part of a machine or plant for the cold aseptic bottling of a liquid in bottles or similar containers.

Yet another possible aspect of at least one possible embodiment of the present application is to indicate a plant for the cold-aseptic bottling of a liquid in bottles or similar container in which, at least one siphon seal is provided with at least one discharge opening or nozzle for a cleaning or sterilization medium, so that this seal and/or its annular duct can then be cleaned and/or sterilized in a CIP cleaning or SIP sterilization, which is a major advantage, in particular in a plant where there are a plurality of siphon seals provided at housing transitions. In particular, the cleaning and sterilization of the siphon seals of a plant with a plurality of such seals is significantly simplified and can be performed in less time.

Still another possible aspect of at least one possible embodiment of the present application is to indicate a plant for the cold-aseptic bottling of a liquid in bottles or similar container in which, in spite of the simplified construction, the presence of the sealing or barrier fluid in the at least one annular duct of the at least one siphon seal at the required level is guaranteed or substantially guaranteed a sealing system that eliminates the disadvantage of having the individual siphon seal exposed to both a sterile space or area as well as to a non-sterile space or area, which means that, for example, that the sealing or barrier fluid can be contaminated by factors from the non-sterile space, and/or by factors from the sterile space, e.g. by the liquid being bottled. Another possible aspect of at least one possible embodiment of the present application is to indicate a plant for the cold-aseptic bottling of a liquid in bottles or similar container in which, the exposure of persons (operating personnel) to unpleasant odors or injuries that can be caused by the barrier fluid is prevented.

One feature or aspect of an embodiment is believed at the time of the filing of this patent application to possibly reside broadly in a plant for the cold aseptic bottling of a liquid in bottles or similar containers, with a conveyor line on which the containers 2 are moved by at least one container handling machine 4, 5, 6 in a sterile space 21 which is separated by a housing from at least one non-sterile space 22, whereby the housing is formed by at least one circulating part 11 and one stationary part 19, and whereby at the transition 8 between these parts, a siphon seal 9 is provided which makes possible the relative motion of the parts, which siphon seal consists of at least one annular duct 24 that concentrically surrounds an axis of the circulating part 11 to hold a sealing or barrier fluid on a ring-shaped wall element 25 on the other part 11 of the housing that extends into the barrier fluid located there, with at least one inlet 32 for the feeding of the barrier fluid into the at least one annular duct 24 and with at least one outlet 33 for the discharge of the barrier fluid out of the annular duct 24, characterized in that the at least one outlet 33 is realized in the form of an overflow that sets the level 27 of the barrier fluid, and that the at least one inlet 32 is connected with a reservoir 34, from which barrier fluid 24 is fed continuously to at least one annular duct.

One feature or aspect of an embodiment is believed at the time of the filing of this patent application to possibly reside broadly in a system for the sealing of a transition 8 between a circulating and a stationary machine element 11; 19, 20 of a plant 1 or device for the treatment of bottles or similar containers 2, in particular for the sealing of the transition 8 between a circulating and a stationary part of a housing of a plant for cold aseptic bottling that separates a sterile room or space 21 from a non-sterile room or space 22, with a siphon seal 9 that makes possible a relative motion between the machine elements 11, 19 and has at least one annular duct 24 that concentrically encircles an axis of the rotating machine element 11 to hold a sealing or barrier fluid on a machine element 19, 20 and at least one annular wall segment 25 on the other machine element that extends into the barrier fluid located in the ring duct 24, characterized by at least one outlet opening or nozzle 50, 51 for a cleaning and/or sterilization medium for the cleaning and/or sterilization of the seal system and thereby in particular of the at least one siphon seal 9 in a CIP and/or SIP sterilization process.

One feature or aspect of an embodiment is believed at the time of the filing of this patent application to possibly reside broadly in a system for the sealing of a transition 8 between a circulating and a stationary machine element 11; 19, 20 of a plant 1 or device for the treatment of bottles or similar containers 2, in particular for the sealing of the transition 8 between a circulating and a stationary part of a housing of a plant for cold aseptic bottling that separates a sterile room or space 21 from a non-sterile room or space 22, with a siphon seal 9 that makes possible a relative motion between the machine elements 11, 19 and has at least one annular duct 24 that concentrically encircles an axis of the rotating machine element 11 to hold a sealing or barrier fluid on a machine element 19, 20 and at least one annular wall segment 25 on the other machine element that extends into the barrier fluid located in the ring duct 24, characterized in that on at least one side of the at least one siphon seal 9, a mechanical seal 31 bridging the transition 8 is povided with at least one seal element 28 on the circulating and/or on the stationary machine element 11; 19, 20 and with at least one sealing surface 30 on the stationary and/or on he circulating machine element 19, 20; 11 that interacts with the sealing element 28.

Another feature or aspect of an embodiment is believed at the time of the filing of this patent application to possibly reside broadly in a sealing system, wherein the mechanical seal 31 is provided on the side of the at least one siphon seal 9 that faces the non-sterile room or space 22.

Yet another feature or aspect of an embodiment is believed at the time of the filing of this patent application to possibly reside broadly in a sealing system, wherein the at least one mechanical seal 31 is provided on the side of the at least one siphon seal 9 that faces the sterile room or area 21.

Still another feature or aspect of an embodiment is believed at the time of the filing of this patent application to possibly reside broadly in a sealing system, wherein the at least one mechanical seal 31 surrounds the at least one siphon seal 9.

A further feature or aspect of an embodiment is believed at the time of the filing of this patent application to possibly reside broadly in a sealing system, wherein the at least one mechanical seal 31 is surrounded by the at least one siphon seal 9.

Another feature or aspect of an embodiment is believed at the time of the filing of this patent application to possibly reside broadly in a sealing system, wherein the at least one sealing element is a sealing ring 28.

Yet another feature or aspect of an embodiment is believed at the time of the filing of this patent application to possibly reside broadly in a sealing system, wherein the at least one sealing element has at least one lip seal 29 that interacts with the sealing surface 30.

Still another feature or aspect of an embodiment is believed at the time of the filing of this patent application to possibly reside broadly in a sealing system, wherein the at least one annular duct 24 has at least one inlet 32 and at least one outlet 33 for the barrier fluid.

A further feature or aspect of an embodiment is believed at the time of the filing of this patent application to possibly reside broadly in a sealing system, wherein the at least one outlet 33 is realized in the form of an overflow that sets the level of the surface 27 of the barrier fluid.

Another feature or aspect of an embodiment is believed at the time of the filing of this patent application to possibly reside broadly in a sealing system, wherein at least one discharge opening or nozzle 50, 51 for a cleaning and/or sterilization medium for the cleaning and/or sterilization of the sealing system, and thereby in particular also of the at least one siphon seal 9 in a CIP cleaning and/or SIP sterilization process.

Yet another feature or aspect of an embodiment is believed at the time of the filing of this patent application to possibly reside broadly in a sealing system, wherein the at least one discharge opening or nozzle 50, 51 is provided on the circulating machine element 11.

Still another feature or aspect of an embodiment is believed at the time of the filing of this patent application to possibly reside broadly in a sealing system, wherein the at least one discharge opening or nozzle 50, 51 is provided on an element 26 of the siphon seal 9, preferably on an element of the siphon seal 9 that is to be fastened to the circulating machine element 11.

A further feature or aspect of an embodiment is believed at the time of the filing of this patent application to possibly reside broadly in a sealing system, wherein the at least one discharge opening or nozzle 50, 51 is provided facing the at least one annular duct 24 of the at least one siphon seal 9 and/or the element 23 of the siphon seal 9 that has this annular duct 24.

Another feature or aspect of an embodiment is believed at the time of the filing of this patent application to possibly reside broadly in a plant or device for treating bottles or similar containers 2 with at least one transition 8 between a circulating machine element 11 and a stationary machine element 19, 20 and with a sealing system that is provided at the transition 8 and makes possible the relative motion between the machine elements, said plant comprising a sealing system.

Yet another feature or aspect of an embodiment is believed at the time of the filing of this patent application to possibly reside broadly in a plant, wherein in a plant for the cold aseptic bottling of a liquid in bottles or similar containers 2, the machine elements that form the transition 8 are parts 11, 19 of a housing that separates a sterile space or area 21 from at least one non-sterile space or area.

Still another feature or aspect of an embodiment is believed at the time of the filing of this patent application to possibly reside broadly in a plant, wherein the at least one inlet of the at least one annular duct 24 of the respective siphon seal 9 is connected with a reservoir 34 from which the annular duct is constantly supplied with barrier fluid.

A further feature or aspect of an embodiment is believed at the time of the filing of this patent application to possibly reside broadly in a plant, wherein a flow meter 44 on the at least one outlet 33 that is realized in the form of an overflow of the respective annular duct 24, whereby the flow meter 44 for monitoring the volume flow of the barrier fluid flowing out of the annular duct 24 is traversed by this flow.

Another feature or aspect of an embodiment is believed at the time of the filing of this patent application to possibly reside broadly in a plant, wherein the flow meter 44 is used to generate a measurement signal which triggers an error message and/or an immediate production interruption if the volume flow flowing back from the at least one annular duct 24 is not equal to the volume flow of the barrier fluid flowing to the at least one annular duct 24 and/or the return volume flow drops below a specified threshold.

Yet another feature or aspect of an embodiment is believed at the time of the filing of this patent application to possibly reside broadly in a plant, wherein in a supply line 41 that is connected with the at least one inlet 32 of the at least one siphon seal 8, means are provided to set or control the volume flow of barrier fluid flowing to the at least one siphon seal 9.

Still another feature or aspect of an embodiment is believed at the time of the filing of this patent application to possibly reside broadly in a plant, wherein at least one sensor unit 40 for the continuous analysis of the returned barrier fluid, in particular for the determination of the concentration of a sterilizing medium in the barrier fluid, via which sensor unit the returned barrier fluid arrives at the reservoir 4 or a device for the treatment of the barrier fluid.

A further feature or aspect of an embodiment is believed at the time of the filing of this patent application to possibly reside broadly in a plant, wherein a plurality of sealing systems provided one at each transition between a circulating and a stationary machine element 11, 19, each with at least one siphon seal 9, whereby all of the siphon seals 9 are supplied with the barrier fluid from a common reservoir 34.

Another feature or aspect of an embodiment is believed at the time of the filing of this patent application to possibly reside broadly in a plant, wherein in the supply line 41 of each siphon seal 9, independent means are provided to set and/or regulate the volume flow of the barrier fluid supplied to it.

Yet another feature or aspect of an embodiment is believed at the time of the filing of this patent application to possibly reside broadly in a plant, wherein a common pump 39 is associated with all of the siphon seals 9 or groups of such seals.

Still another feature or aspect of an embodiment is believed at the time of the filing of this patent application to possibly reside broadly in a plant, wherein individual flow meters 44 are provided on the at least one outlet 33 or on the return 43 of each siphon seal connected to this outlet 33.

A further feature or aspect of an embodiment is believed at the time of the filing of this patent application to possibly reside broadly in a plant, wherein the reservoir 34 for supplying the siphon seals 9 with barrier fluid is simultaneously the reservoir for the collection of the returned barrier fluid.

Another feature or aspect of an embodiment is believed at the time of the filing of this patent application to possibly reside broadly in a plant, wherein on the reservoir 34 for the barrier fluid, means 35, 36, 37, 38 are provided to set and regulate a specified concentration of sterilization medium or to make up the necessary quantity of sterilization medium.

Some examples of bottling and container handling systems and components thereof which may possibly be utilized or adapted for use in at least one possible embodiment, may possibly be found in the following U.S. Pat. No. 6,484,477, entitled "Capping Machine for Capping and Closing Containers, and a Method for Closing Containers;" U.S. Pat. No. 6,474,368, entitled "Beverage Container Filling Machine, and Method for Filling Containers with a Liquid Filling Material in a Beverage Container Filling Machine;" U.S. Pat. No. 6,494,238, entitled "A Plant for Filling Beverage into Beverage Bottles Other Beverage Containers Having Apparatus for Replacing Remaining Air Volume in Filled Beverage Bottles or Other Beverage Containers;" U.S. Pat. No. 6,470,922, entitled "Apparatus for the Recovery of an Inert Gas;" U.S. Pat. No. 6,463,964, entitled "Method of Operating a Plant for Filling Bottles, Cans or the like Beverage Containers with a Beverage, and a Beverage Container Filling Machine;" U.S. Pat. No. 6,834,473, entitled "Bottling Plant and Method of Operating a Bottling Plant and a Bottling Plant with Sections for Stabilizing the Bottled Product;" U.S. Pat. No. 6,484,762, entitled "A Filling System with Post-dripping Prevention;" U.S. Pat. No. 6,668,877, entitled "Filling System for Still Beverages;" U.S. Pat. No. 7,024,841, entitled "Labeling Machine with a Sleeve Mechanism for Preparing and Applying Cylindrical Labels onto Beverage Bottles and Other Beverage Containers in a Beverage Container Filling Plant;" U.S. Pat. No. 6,971,219 entitled "Beverage bottling plant for filling bottles with a liquid beverage filling material and a labelling station for labelling filled bottles and other containers;" U.S. Pat. No. 6,973,767, entitled "Beverage bottling plant and a conveyor arrangement for transporting packages;" U.S. Pat. No. 7,013,624, entitled "Beverage bottling plant for filling bottles with a liquid beverage filling material, a container filling plant container information adding station, such as, a labeling station, configured to add information to containers, such as, bottles and cans, and modules for labeling stations;" U.S. Pat. No. 7,108,025, entitled "Beverage Bottling Plant for Filling Bottles with a Liquid Beverage Filling Material, and a Container Filling Lifting Device for Pressing Containers to Container Filling Machines;" U.S. Pat. No. 7,062,894, entitled "Beverage Bottling Plant for Filling Bottles with a Liquid Beverage Filling Material, and a Container Filling Plant Container Information Adding Station, Such As, a Labeling Station Having a Sleeve Label Cutting Arrangement, Configured to Add Information to Containers, Such As, Bottles and Cans;" U.S. Pat. No. 7,010,900, entitled "Beverage Bottling Plant for Filling Bottles with a Liquid Beverage Filling Material, and a Cleaning Device for Cleaning Bottles in a Beverage Bottling Plant;" U.S. Pat. No. 6,918,417, entitled "A Beverage Bottling Plant for Filling Bottles with a Liquid Beverage Filling Material, and an Easily Cleaned Lifting Device in a Beverage Bottling Plant;" U.S. Pat. No. 7,065,938, entitled "A Beverage Bottling Plant for Filling Bottles with a Liquid Beverage Filling Material, and a Container Filling Plant Container Information Adding Station, Such As, a Labeling Station Having a Gripper Arrangement, Configured to Add Information to Containers, Such As, Bottles and Cans;" U.S. Pat. No. 6,901,720, entitled "A Beverage Bottling Plant for Filling Bottles with a Liquid Beverage Filling Material, and Apparatus for Attaching Carrying Grips to Containers with Filled Bottles;" and U.S. Pat. No. 7,121,062 "Beverage bottling plant for filling bottles with a liquid beverage filling material, having a container handling machine with interchangeable receptacles for the container mouth."

The components disclosed in the various publications, disclosed or incorporated by reference herein, may possibly be used in possible embodiments of the present invention, as well as equivalents thereof.

Some examples of bottling systems, which may be used or adapted for use in at least one possible embodiment of the present may be found in the following U.S. Patents assigned to the Assignee herein, namely: U.S. Pat. No. 4,911,285; U.S. Pat. No. 4,944,830; U.S. Pat. No. 4,950,350; U.S. Pat. No. 4,976,803; U.S. Pat. No. 4,981,547; U.S. Pat. No. 5,004,518; U.S. Pat. No. 5,017,261; U.S. Pat. No. 5,062,917; U.S. Pat. No. 5,062,918; U.S. Pat. No. 5,075,123; U.S. Pat. No. 5,078,826; U.S. Pat. No. 5,087,317; U.S. Pat. No. 5,110,402; U.S. Pat. No. 5,129,984; U.S. Pat. No. 5,167,755; U.S. Pat. No. 5,174,851; U.S. Pat. No. 5,185,053; U.S. Pat. No. 5,217,538; U.S. Pat. No. 5,227,005; U.S. Pat. No. 5,413,153; U.S. Pat. No. 5,558,138; U.S. Pat. No. 5,634,500; U.S. Pat. No. 5,713,403; U.S. Pat. No. 6,276,113; U.S. Pat. No. 6,213,169; U.S. Pat. No. 6,189,578; U.S. Pat. No. 6,192,946; U.S. Pat. No. 6,374,575; U.S. Pat. No. 6,365,054; U.S. Pat. No. 6,619,016; U.S. Pat. No. 6,474,368; U.S. Pat. No. 6,494,238; U.S. Pat. No. 6,470,922; and U.S. Pat. No. 6,463,964.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Some examples of bottling and container handling systems and components thereof which may possibly be utilized or adapted for use in at least one possible embodiment, may possibly be found in the following U.S. patent applications Ser. No. 10/723,451, filed on Nov. 26, 2003, entitled "Beverage Bottling Plant for Filling Beverage Bottles or Other Beverage Containers with a Liquid Beverage Filling Material and Arrangement for Dividing and Separating of a Stream of Beverage Bottles or Other Beverage Containers;" Ser. No. 10/739,895, filed on Dec. 18, 2003, entitled "Method of Operating a Beverage Container Filling Plant with a Labeling Machine for Labeling Beverage Containers Such as Bottles and Cans, and a Beverage Container Filling Plant with a Labeling Machine for Labeling Beverage Containers Such as Bottles and Cans;" Ser. No. 10/865,240, filed on Jun. 10, 2004, Entitled "A Beverage Bottling Plant for Filling Bottles with a Liquid Beverage Filling Material, a Beverage Container Filling Machine, and a Beverage Container Closing Machine;" Ser. No. 10/883,591, filed on Jul. 1, 2004, entitled "A Beverage Bottling Plant for Filling Bottles with a Liquid Beverage Filling Material Having a Container Filling Plant Container Information Adding Station, Such As, a Labeling Station, Configured to Add Information to Containers, Such As, Bottles and Cans, and Modules for Labeling Stations and a Bottling Plant Having a Mobile Module Carrier;" Ser. No. 10/930,678, filed on Aug. 31, 2004, entitled "A Beverage Bottling Plant for Filling Bottles with a Liquid Beverage Filling Material, a Container Filling Plant Container Filling Machine, and a Filter Apparatus for Filtering a Liquid Beverage;" Ser. No. 10/931,817, filed on Sep. 1, 2004, entitled "A Beverage Bottling Plant for Filling Bottles with a Liquid Beverage Filling Material, Having an Apparatus for Exchanging Operating Units Disposed at Rotating Container Handling Machines;" Ser. No. 10/954,012, filed on Sep. 29, 2004, Ser. No. 10/952,706, Ser. No. 10/962,183, filed on Oct. 8, 2004, Ser. No. 10/967,016, filed on Oct. 15, 2004, Ser. No. 10/982,706, filed on Nov. 5, 2004, Ser. No. 10/982,694, Ser. No. 10/982,710, Ser. No. 10/984,677, filed on Nov. 9, 2004, Ser. No. 10/985,640, filed on Nov. 10, 2004, Ser. No. 11/004,663, filed on Dec. 3, 2004, Ser. No. 11/009,551, filed on Dec. 10, 2004, Ser. No. 11/012,859, filed on Dec. 15, 2004, Ser. No. 11/014,673, filed on Dec. 16, 2004, Ser. No. 11/016,364, filed on Dec. 17, 2004, and Ser. No. 11/016,363, The appended drawings in their entirety, including all dimensions, proportions and/or shapes in at least one embodiment of the invention, are accurate and are hereby included by reference into this specification.

Some examples of flow meters that may possibly be utilized or possibly adapted for use in at least one possible embodiment of the present application may possibly be found in the following U.S. Patent Publications: U.S. Pat. No. 7,139,667, entitled "Method for Calibrating a Volumetric Flow Meter Having an Array of Sensors"; U.S. Pat. No. 7,127,953, entitled "Target flow meters"; U.S. Pat. No. 6,845,704, "Beverage Making System with Flow Meter Measurement Control and Method"; U.S. Pat. No. 6,394,312, entitled "Beverage Feeding Apparatus"; U.S. Pat. No. 5,876,610, entitled "Method and Apparatus for Monitoring Liquid Flow Through an Enclosed Stream"; and U.S. Pat. No. 7,069,793, entitled "Ultrasonic Flow Meter and Ultrasonic Sensor".

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Some examples of control systems which measure operating parameters and learn therefrom that may possibly be utilized or possibly adapted for use in at least one possible embodiment of the present application may possibly be found in the following U.S. Pat. No. 4,655,188 issued to Tomisawa et al. on Apr. 7, 1987; U.S. Pat. No. 5,191,272 issued to Torii et al. on Mar. 2, 1993; U.S. Pat. No. 5,223,820, issued to Sutterlin et al. on Jun. 29, 1993; and U.S. Pat. No. 5,770,934 issued to Theile on Jun. 23, 1998.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

Some examples of control valve apparatus that may possibly be utilized or possibly adapted for use in at least one possible embodiment of the present application may possibly be found in the following U.S. Pat. No. 5,406,975 issued to Nakamichi et al. on Apr. 18, 1995; U.S. Pat. No. 5,503,184 issued to Reinartz et al. on Apr. 2, 1996; U.S. Pat. No. 5,706,849 issued to Uchida et al. on Jan. 13, 1998; U.S. Pat. No. 5,975,115 issued to Schwegler et al. on Nov. 2, 1999; U.S. Pat. No. 6,142,445 issued to Kawaguchi et al. on Nov. 7, 2000; and U.S. Pat. No. 6,145,538 issued to Park on Nov. 14, 2000.

All of the patents, patent applications and publications recited herein, and in the Declaration attached hereto, are hereby incorporated by reference as if set forth in their entirety herein.

Some examples of seal arrangements that may possibly be utilized or possibly adapted for use in at least one possible embodiment of the present application may possibly be found in the following U.S. Pat. No. 5,411,273 issued to Pietsch et al. on May 2, 1995; U.S. Pat. No. 6,290,234 issued to Berle et al. on Sep. 18, 2001; U.S. Pat. No. 6,474,653 issued to Hintenlang et al. on Nov. 5, 2002; U.S. Pat. No. 6,616,146 issued to Friend et al. on Sep. 9, 2003; U.S. Pat. No. 6,692,007 issued to Oldenburg on Feb. 17, 2004; and U.S. Pat. No. 6,648,335 issued to Ezell on Nov. 18, 2003.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

Some examples of position sensors or position sensor systems that may be used or adapted for use in at least one possible embodiment of the present invention may be found in the following U.S. Pat. No. 5,794,355, issued to inventor Nickum on Aug. 18, 1998; U.S. Pat. No. 5,520,290, issued to inventors Kumar et al. on May 28, 1996; U.S. Pat. No. 5,074,053, issued to inventor West on Dec. 24, 1991; and U.S. Pat. No. 4,087,012, issued to inventor Fogg on May 2, 1978.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

Some examples of computer systems that may possibly be utilized or possibly adapted for use in at least one possible embodiment of the present application may possibly be found in the following U.S. Pat. No. 5,416,480 issued to Roach et al. on May 16, 1995; U.S. Pat. No. 5,479,355 issued to Hyduke on Dec. 26, 1995; U.S. Pat. No. 5,481,730 issued to Brown et al. on Jan. 2, 1996; U.S. Pat. No. 5,805,094 issued to Roach et al. on Sep. 8, 1998; U.S. Pat. No. 5,881,227 issued to Atkinson et al. on Mar. 9, 1999; and U.S. Pat. No. 6,072,462 issued to Moshovich on Jun. 6, 2000.

All of the patents, patent applications or patent publications, which were cited in the German Office Action dated November 16, 2006, and/or cited elsewhere are hereby incorporated by reference as if set forth in their entirety herein as follows: WO 2004/065283 A1, EP 1 369 379 A1, DE 201 20 014 U1, and U.S. Pat. No. 3,799,220.

Some examples of electric control valves that may possibly be utilized or possibly adapted for use in at least one possible embodiment of the present application may possibly be found in the following U.S. Pat. No. 4,431,160 issued to Burt et al. on Feb. 14, 1984; and U.S. Pat. No. 4,609,176 issued to Powers on Sep. 2, 1986.

All of the patents, patent applications or patent publications, which were cited in the German Office Action dated Nov. 16, 2006, and/or cited elsewhere are hereby incorporated by reference as if set forth in their entirety herein as follows: WO 2004/065283 A1, EP 1 369 379 A1, DE 201 20 014 U1, and U.S. Pat. No. 3,799,220.

The corresponding foreign and international patent publication applications, namely, Federal Republic of Germany Patent Application No. 10 2006 007 366.3, filed on Feb. 17, 2006, having inventors Volker TILL and Dr. Daryoush SANGI, and DE-OS 10 2006 007 366.3 and DE-PS 10 2006 007 366.3, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

U.S. patent application Ser. No. 11/676,081, filed on Feb. 16, 2007, having inventors Volker TILL and Dr. Daryoush SANGI, corresponding Federal Republic of Germany Patent Application No. 10 2006 007 481.5, filed on Feb. 17, 2006, and title "BEVERAGE BOTTLING PLANT FOR FILLING BOTTLES WITH A LIQUID BEVERAGE FILLING MATERIAL" is hereby incorporated by reference as if set forth in its entirety herein.

U.S. patent application Ser. No. 11/676,090, filed on Feb. 16, 2007, having inventors Volker TILL and Dr. Daryoush SANGI, corresponding Federal Republic of Germany Patent Application No. 10 2006 007 367.3, filed on Feb. 17, 2006, and title "BEVERAGE BOTTLING PLANT FOR FILLING BOTTLES WITH A LIQUID BEVERAGE FILLING MATERIAL HAVING A SEALING SYSTEM FOR SEALING A TRANSITION BETWEEN A MOVABLE PORTION AND A STATIONARY PORTION" is hereby incorporated by reference as if set forth in its entirety herein.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

U.S. Pat. No. 7,121,062 B2, issued on Oct. 17, 2006, having inventor Volker TILL, corresponding Federal Republic of Germany Patent Application No. 103 42 415, filed on Sep. 13, 2003, and title "Beverage Bottling Plant for Filling Beverage Bottles with a Liquid Beverage Filling Material, Having a Container Handling Machine with Interchangeable Receptacles for the Container Mouth" is hereby incorporated by reference as if set forth in its entirety herein.

The details in the patents, patent applications and publications may be considered to be incorporable, at applicant's option, into the claims during prosecution as further limitations in the claims to patentably distinguish any amended claims from any applied prior art.

U.S. Pat. No. 7,121,062 B2, issued on Oct. 17, 2006, having inventor Volker TILL, corresponding Federal Republic of Germany Patent Application No. 103 42 415, filed on Sep. 13, 2003, and title "Beverage Bottling Plant for Filling Beverage Bottles with a Liquid Beverage Filling Material, Having a Container Handling Machine with Interchangeable Receptacles for the Container Mouth" is hereby incorporated by reference as if set forth in its entirety herein.

Some examples of flow meters that may possibly be utilized or adapted for use in at least one possible embodiment are as follows: Flo-Gage, manufactured by RCM Industries, located at 110 Mason Circle, Suite D, Concord, Calif., 94520, U.S.A.; and Positive Displacement Flow Meters and Meter-Mounted Flow Monitors, manufactured by Ryan Herco Products Corporation, P.O. Box 588, Burbank, Calif., 91503-0588, U.S.A.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE

1 Aseptic cold bottling plant
2 Bottle
3 Conveyor
4 Sterilizer
5 Filling machine
6 Capping machine
7 Conveyor
8 Transition between a circulating and a stationary part of the housing
9 Siphon or labyrinth seal
10 Treatment head
11 Rotor
12 Nozzle tube
13 Bottle or container carrier
14 Piston
15 Restoring spring
16 Duct
17 Nozzle system
18 Opening
19 Wall element
20 Machine frame
21 Sterile space
22 Non-sterile space or environment
23 Ring
24 Annular duct
25 Ring segment
26 Annular body
27 Level of the sealing or barrier fluid
28 Sealing ring
29 Lip seal
30 Sealing surface
31 Mechanical seal
32 Inlet
33 Outlet
34 Tank
35 Processor
36, 37 Control valve
38 Sensor
39 Pump
40 Distributor
41 Supply line
42 Flow control valve
43 Return line 44 Flow meter
45 Buffer tank
46 Control valve
47 Main line
48 Pump
49 Sensor unit
50, 51 Discharge opening or nozzle for cleaning or sterilization medium
52 Drain
A Direction of transport

What is claimed is:

1. A beverage bottling plant for aseptic filling of beverage bottles with liquid beverage material, said beverage bottling plant comprising:

a beverage bottle cleaning machine being configured and disposed to clean beverage bottles;
a first conveyor arrangement being configured and disposed to convey beverage bottles to be cleaned to said beverage bottle cleaning machine;
a rotary beverage bottle sterilizing machine being configured and disposed to sterilize beverage bottles with a sterilizing medium;
said beverage bottle sterilizing machine comprising:
  a rotor;
  a rotatable vertical machine column;
  said rotor being connected to said vertical machine column to permit rotation of said rotor about said vertical machine column;
  a plurality of beverage bottle holding elements for holding beverage bottles being disposed on the periphery of said rotor;
  at least one dispensing arrangement being configured and disposed to dispense sterilizing medium to sterilize beverage bottles;
  a first star wheel structure being configured and disposed to move beverage bottles into said beverage bottle sterilizing machine; and
  a second star wheel structure being configured and disposed to move beverage bottles out of said beverage bottle sterilizing machine;
a second conveyor arrangement being configured and disposed to convey filled beverage bottles from said beverage bottle cleaning machine to said beverage bottle sterilizing machine;
a rotary beverage bottle filling machine being configured and disposed to fill beverage bottles with liquid beverage material;
said beverage bottle filling machine comprising:
  a rotor;
  a rotatable vertical machine column;
  said rotor being connected to said vertical machine column to permit rotation of said rotor about said vertical machine column;
  a plurality of beverage bottle filling elements for filling beverage bottles with liquid beverage material being disposed on the periphery of said rotor;
  each of said plurality of beverage bottle filling elements comprising a container carrier being configured and disposed to receive and hold beverage bottles to be filled;
  each of said plurality of beverage bottle filling elements being configured and disposed to dispense liquid beverage material into beverage bottles to be filled;
  at least one liquid reservoir being configured to hold a supply of liquid beverage material;
  at least one supply line being configured and disposed to connect said at least one liquid reservoir to said beverage bottle filling machine to supply liquid beverage material to said beverage bottle filling machine;
  a first star wheel structure being configured and disposed to move beverage bottles into said beverage bottle filling machine; and
  a second star wheel structure being configured and disposed to move beverage bottles out of said beverage bottle filling machine;
a third conveyor arrangement being configured and disposed to convey filled beverage bottles from said beverage bottle sterilizing machine to said beverage bottle filling machine;
a rotary beverage bottle closing machine being configured and disposed to close tops of filled beverage bottles;
said beverage bottle closing machine comprising:
  a rotor;
  a rotatable vertical machine column;
  said rotor being connected to said vertical machine column to permit rotation of said rotor about said vertical machine column;
  a plurality of closing devices being disposed on the periphery of said rotor;
  each of said plurality of closing devices being configured and disposed to place closures on filled beverage bottles;
  each of said plurality of closing devices comprising a container carrier being configured and disposed to receive and hold filled beverage bottles;
  a first star wheel structure being configured and disposed to move filled beverage bottles into said beverage bottle closing machine; and
  a second star wheel structure being configured and disposed to move filled, closed beverage bottles out of said beverage bottle closing machine;
a fourth conveyor arrangement being configured and disposed to convey filled beverage bottles from said beverage bottle filling machine to said beverage bottle closing machine;
a rotary beverage bottle labeling machine being configured and disposed to label filled, closed beverage bottles;
said beverage bottle labeling machine comprising:
  a rotor;
  a rotatable vertical machine column;
  said rotor being connected to said vertical machine column to permit rotation of said rotor about said vertical machine column;
  a plurality of beverage bottle support structures being disposed on the periphery of said rotor;
  said beverage bottle support structures being configured to support and hold filled, closed beverage bottles;
  a first star wheel structure being configured and disposed to move filled, closed beverage bottles into said beverage bottle labeling machine;
  a second star wheel structure being configured and disposed to move labeled beverage bottles out of said beverage bottle labeling machine; and
  at least one beverage bottle labeling device being configured and disposed to affix a label to the surface of a beverage bottle;
a fifth conveyor arrangement being configured and disposed to convey filled, closed beverage bottles from said beverage bottle closing machine to said beverage bottle labeling machine;
a beverage bottle packaging machine being configured and disposed to package beverage bottles into packs;
a sixth conveyor arrangement being configured and disposed to convey filled, closed, labeled beverage bottles from said beverage bottle labeling machine to said beverage bottle packaging machine;

a reservoir being configured and disposed to hold a supply of barrier fluid; and each of said beverage bottle sterilizing machine, said beverage bottle filling machine, and said beverage bottle closing machine comprising:

a housing being configured and disposed to enclose a sterile space containing a sterilizing medium, in which beverage bottles are to be handled;

said housing comprising a stationary portion and a movable portion;

said movable portion being mounted on said rotor;

said housing comprising a transition portion being disposed between said stationary portion and said movable portion; and said transition portion comprising:

a siphon seal being configured and disposed to substantially prevent escape of sterilizing medium out of said housing through said transition portion to minimize the loss of sterilizing medium and to minimize adverse effects caused by the sterilizing medium or the smell thereof on plant-operating personnel working in an adjacent non-sterile area;

said siphon seal comprising:

an annular duct being mounted on said stationary portion and being disposed concentrically about said rotor;

said annular duct being configured to hold barrier fluid therein;

a ring-shaped wall element being connected to said movable portion; and said ring-shaped wall element comprising a projecting portion being configured and disposed to project and into said annular duct and said barrier fluid therein; and at least one outlet or nozzle opening being configured and disposed to permit the introduction of cleaning and/or sterilization medium into said siphon seal for the cleaning and/or sterilization of said siphon seal in a CIP cleaning process and/or in an SIP sterilization process.

2. The beverage bottling plant according to claim 1, wherein said at least one outlet opening or nozzle is disposed at said movable portion of said housing.

3. The beverage bottling plant according to claim 2, wherein:

said at least one outlet opening or nozzle is disposed in said ring-shaped wall element of said siphon seal; and said at least one outlet opening or nozzle is disposed opposite said annular duct of said siphon seal.

4. The beverage bottling plant according to claim 3, wherein:

said transition portion comprises a mechanical seal configured and disposed to seal a gap adjacent said annular duct between said movable portion and said stationary portion;

said siphon seal is surrounded or enclosed by said mechanical seal to minimize the escape of barrier fluid out of said siphon seal into an adjacent non-sterile area, to minimize contamination of said barrier fluid in said siphon seal by contaminants in an adjacent non-sterile area, and to minimize adverse effects caused by the barrier fluid or the smell thereof on plant-operating personnel working in an adjacent non-sterile area; and said mechanical seal comprising:

a sealing element or sealing ring mounted on said annular duct or said ring-shaped wall element of said siphon seal; and a sealing surface formed on the other of said annular duct or said ring-shaped wall element of said siphon seal where said sealing element is mounted.

5. The beverage bottling plant according to claim 4, wherein:

said sealing element or sealing ring comprises a lip seal portion which interacts with said sealing surface;

said transition portion comprises:

an inlet arrangement configured and disposed to permit the substantially continuous feeding of said barrier fluid from said reservoir and into said annular duct;

said inlet arrangement comprises at least one inlet device through which said barrier fluid is to be fed into said annular duct;

an outlet arrangement configured and disposed to permit the discharge of said barrier fluid out of said annular duct and back to said reservoir;

said outlet arrangement comprises at least one outlet device through which said barrier fluid is to be discharged from said annular duct; and said outlet arrangement comprises an overflow being configured and disposed to set the level of said barrier fluid in said annular duct.

6. The beverage bottling plant according to claim 5, wherein:

said beverage bottling plant comprises a supply line arrangement configured and disposed to permit the flow of said barrier fluid from said reservoir to said inlet arrangements; and said beverage bottling plant comprises a return line arrangement configured and disposed to permit the flow of said barrier fluid from said outlet arrangements to said reservoir; and said return line arrangement comprises a flow meter arrangement through which said barrier fluid flows to monitor the volume flow of said barrier fluid flowing out of said annular ducts.

7. The beverage bottling plant according to claim 6, wherein:

said flow meter arrangement is configured to generate an error signal to trigger an error message and/or an immediate production interruption upon the volume flow flowing back from said annular ducts is not equal to the volume flow of said barrier fluid flowing to said annular ducts and/or the volume flow flowing back from said annular ducts drops below a specified threshold; and said supply line arrangement comprises a regulation arrangement configured to regulate the volume flow of said barrier fluid flowing to said inlet arrangements.

8. The beverage bottling plant according to claim 7, wherein:

said supply line arrangement comprises at least one sensor unit; and said at least one sensor unit is configured to substantially continuously analyze returning barrier fluid for the determination of the concentration of a sterilizing medium in said returned barrier fluid, by means of which sensor unit the returned barrier fluid returns to said reservoir or to a reprocessing device configured to reprocess said barrier fluid.

9. The beverage bottling plant according to claim 8, wherein:

said supply line arrangement comprises a plurality of individual supply lines corresponding to each of said inlet arrangements;

each of said supply lines comprises a regulation arrangement configured to regulate the volume flow of said barrier fluid flowing to said inlet arrangements; and said return line arrangement comprises a common pump which is associated with all of said siphon seals.

10. The beverage bottling plant according to claim 9, wherein:

said return line arrangement comprises a plurality of individual return lines corresponding to each of said outlet arrangements; and said flow meter arrangement comprises a plurality of individual flow meters;

each of said flow meters being disposed in:
 a corresponding one of said outlet arrangements; or
 a corresponding one of said return lines; and on the reservoir for the barrier fluid, means are provided for the setting and regulation of a specified concentration of sterilization medium or to make up the quantity of sterilization medium.

11. A container filling plant for aseptic filling of containers, said container filling plant comprising:

a rotary sterilizing machine being configured and disposed to sterilize containers with a sterilizing medium;

a first conveyor arrangement being configured and disposed to convey containers to be cleaned to said sterilizing machine;

said sterilizing machine comprising:
 a rotor;
 a rotatable vertical machine column;
 said rotor being connected to said vertical machine column to permit rotation of said rotor about said vertical machine column;
 a plurality of holding elements for holding containers being disposed on the periphery of said rotor;
 at least one dispensing arrangement being configured and disposed to dispense sterilizing medium to sterilize containers;
 a first star wheel structure being configured and disposed to move containers into said sterilizing machine; and
 a second star wheel structure being configured and disposed to move containers out of said sterilizing machine;

a rotary filling machine being configured and disposed to fill containers;

said filling machine comprising:
 a rotor;
 a rotatable vertical machine column;
 said rotor being connected to said vertical machine column to permit rotation of said rotor about said vertical machine column;
 a plurality of filling elements for filling containers being disposed on the periphery of said rotor;
 each of said plurality of filling elements comprising a container carrier being configured and disposed to receive and hold containers to be filled;
 a first star wheel structure being configured and disposed to move containers into said filling machine; and
 a second star wheel structure being configured and disposed to move containers out of said filling machine;

a second conveyor arrangement being configured and disposed to convey filled containers from said sterilizing machine to said filling machine;

a rotary closing machine being configured and disposed to close tops of filled containers;

said closing machine comprising:
 a rotor;
 a rotatable vertical machine column;
 said rotor being connected to said vertical machine column to permit rotation of said rotor about said vertical machine column;
 a plurality of closing devices being disposed on the periphery of said rotor;
 each of said plurality of closing devices being configured and disposed to place closures on filled containers;
 each of said plurality of closing devices comprising a container carrier being configured and disposed to receive and hold filled containers;
 a first star wheel structure being configured and disposed to move filled containers into said closing machine; and
 a second star wheel structure being configured and disposed to move filled, closed containers out of said closing machine;

a third conveyor arrangement being configured and disposed to convey filled containers from said filling machine to said closing machine;

a packaging machine being configured and disposed to package containers into packs;

a fourth conveyor arrangement being configured and disposed to convey filled, closed containers from said closing machine to said packaging machine;

a reservoir being configured and disposed to hold a supply of barrier fluid; and each of said sterilizing machine and at least one of: said filling machine and said closing machine comprising:
 a housing being configured and disposed to enclose a sterile space containing a sterilizing medium, in which containers are to be handled;
 said housing comprising a stationary portion and a movable portion;
 said movable portion being mounted on said rotor;
 said housing comprising a transition portion being disposed between said stationary portion and said movable portion; and
 said transition portion comprising:
  a siphon seal being configured and disposed to substantially prevent escape of sterilizing medium out of said housing through said transition portion to minimize the loss of sterilizing medium and to minimize adverse effects caused by the sterilizing medium or the smell thereof on plant-operating personnel working in an adjacent non-sterile area;
  said siphon seal comprising:
   an annular duct being mounted on said stationary portion and being disposed concentrically about said rotor;
   said annular duct being configured to hold barrier fluid therein;
   a ring-shaped wall element being connected to said movable portion; and
   said ring-shaped wall element comprising a projecting portion being configured and disposed to project and into said annular duct and said barrier fluid therein; and
  at least one outlet or nozzle opening being configured and disposed to permit the introduction of cleaning and/or sterilization medium into said siphon seal for the cleaning and/or sterilization of said siphon seal in a CIP cleaning process and/or in an SIP sterilization process.

12. The container filling plant according to claim 11, wherein said at least one outlet opening or nozzle is disposed at said movable portion of said housing.

13. The container filling plant according to claim 12, wherein:
- said at least one outlet opening or nozzle is disposed in said ring-shaped wall element of said siphon seal; and
- said at least one outlet opening or nozzle is disposed opposite said annular duct of said siphon seal.

14. The container filling plant according to claim 13, wherein:
- said transition portion comprises a mechanical seal configured and disposed to seal a gap adjacent said annular duct between said movable portion and said stationary portion;
- said siphon seal is surrounded or enclosed by said mechanical seal to minimize the escape of barrier fluid out of said siphon seal into an adjacent non-sterile area, to minimize contamination of said barrier fluid in said siphon seal by contaminants in an adjacent non-sterile area, and to minimize adverse effects caused by the barrier fluid or the smell thereof on plant-operating personnel working in an adjacent non-sterile area; and
- said mechanical seal comprising:
  - a sealing element or sealing ring mounted on said annular duct or said ring-shaped wall element of said siphon seal; and
  - a sealing surface formed on the other of said annular duct or said ring-shaped wall element of said siphon seal where said sealing element is mounted.

15. The container filling plant according to claim 14, wherein:
- said sealing element or sealing ring comprises a lip seal portion which interacts with said sealing surface;
- said transition portion comprises:
  - an inlet arrangement configured and disposed to permit the substantially continuous feeding of said barrier fluid from said reservoir and into said annular duct;
  - said inlet arrangement comprises at least one inlet device through which said barrier fluid is to be fed into said annular duct;
  - an outlet arrangement configured and disposed to permit the discharge of said barrier fluid out of said annular duct and back to said reservoir;
  - said outlet arrangement comprises at least one outlet device through which said barrier fluid is to be discharged from said annular duct; and
  - said outlet arrangement comprises an overflow being configured and disposed to set the level of said barrier fluid in said annular duct.

16. The container filling plant according to claim 15, wherein:
- said container filling plant comprises a supply line arrangement configured and disposed to permit the flow of said barrier fluid from said reservoir to said inlet arrangements; and
- said container filling plant comprises a return line arrangement configured and disposed to permit the flow of said barrier fluid from said outlet arrangements to said reservoir; and
- said return line arrangement comprises a flow meter arrangement through which said barrier fluid flows to monitor the volume flow of said barrier fluid flowing out of said annular ducts.

17. The container filling plant according to claim 16, wherein:
- said flow meter arrangement is configured to generate an error signal to trigger an error message and/or an immediate production interruption upon the volume flow flowing back from said annular ducts is not equal to the volume flow of said barrier fluid flowing to said annular ducts and/or the volume flow flowing back from said annular ducts drops below a specified threshold; and
- said supply line arrangement comprises a regulation arrangement configured to regulate the volume flow of said barrier fluid flowing to said inlet arrangements.

18. The container filling plant according to claim 17, wherein:
- said supply line arrangement comprises at least one sensor unit; and
- said at least one sensor unit is configured to substantially continuously analyze returning barrier fluid for the determination of the concentration of a sterilizing medium in said returned barrier fluid, by means of which sensor unit the returned barrier fluid returns to said reservoir or to a reprocessing device configured to reprocess said barrier fluid.

19. The container filling plant according to claim 18, wherein:
- said supply line arrangement comprises a plurality of individual supply lines corresponding to each of said inlet arrangements;
- each of said supply lines comprises a regulation arrangement configured to regulate the volume flow of said barrier fluid flowing to said inlet arrangements; and
- said return line arrangement comprises a common pump which is associated with all of said siphon seals.

20. The container filling plant according to claim 19, wherein:
- said return line arrangement comprises a plurality of individual return lines corresponding to each of said outlet arrangements; and
- said flow meter arrangement comprises a plurality of individual flow meters;
- each of said flow meters being disposed in:
  - a corresponding one of said outlet arrangements; or
  - a corresponding one of said return lines;
- on the reservoir for the barrier fluid, means are provided for the setting and regulation of a specified concentration of sterilization medium or to make up the quantity of sterilization medium; and
- said transition portion of said housing comprises a mechanical seal mounted on said movable portion.

* * * * *